(12) United States Patent
Ishihara et al.

(10) Patent No.: US 11,131,838 B2
(45) Date of Patent: Sep. 28, 2021

(54) OPTICAL SYSTEM, AND IMAGING APPARATUS AND PROJECTING APPARATUS HAVING THE SAME

(71) Applicant: CANON KABUSHIKI KAISHA, Tokyo (JP)

(72) Inventors: Keiichiro Ishihara, Ageo (JP); Masatsugu Nakano, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 437 days.

(21) Appl. No.: 16/116,737

(22) Filed: Aug. 29, 2018

(65) Prior Publication Data

US 2019/0011684 A1 Jan. 10, 2019

Related U.S. Application Data

(63) Continuation of application No. PCT/JP2017/007614, filed on Feb. 28, 2017.

(30) Foreign Application Priority Data

Mar. 4, 2016 (JP) .............................. JP2016-042686

(51) Int. Cl.
| | |
|---|---|
| *G02B 9/00* | (2006.01) |
| *G02B 17/00* | (2006.01) |
| *G02B 3/08* | (2006.01) |
| *G02B 17/08* | (2006.01) |
| *G02B 13/00* | (2006.01) |
| *H04N 7/18* | (2006.01) |
| *B60Q 9/00* | (2006.01) |

(Continued)

(52) U.S. Cl.
CPC ......... *G02B 17/0856* (2013.01); *B60Q 9/008* (2013.01); *B60T 7/22* (2013.01); *B60T 8/17* (2013.01); *G02B 13/006* (2013.01); *G02B 13/0055* (2013.01); *G02B 17/08* (2013.01); *H04N 7/18* (2013.01); *H04N 7/188* (2013.01); *B60T 2201/022* (2013.01); *G02B 13/18* (2013.01); *H04N 5/2254* (2013.01)

(58) Field of Classification Search
CPC .......... G02B 3/00; G02B 9/02; G02B 17/086; G02B 5/005; G02B 13/00; G02B 3/08
USPC ........ 359/796, 797, 642, 726, 738–739, 741
See application file for complete search history.

(56) References Cited

U.S. PATENT DOCUMENTS

| | | | |
|---|---|---|---|
| 5,963,376 A | 10/1999 | Togino | |
| 2003/0030917 A1* | 2/2003 | Omura | ............... G02B 17/0812 359/691 |

FOREIGN PATENT DOCUMENTS

| | | |
|---|---|---|
| CN | 103364930 A | 10/2013 |
| JP | 2002-189172 A | 7/2002 |

(Continued)

*Primary Examiner* — Dawayne Pinkney
(74) *Attorney, Agent, or Firm* — Canon U.S.A., Inc. IP Division

(57) ABSTRACT

An optical system 10 includes, in order from an enlargement side, a front group 1, an aperture diaphragm 3, and a rear group 2, the front group 1 including a refractive surface 11a convex toward the enlargement side, the rear group 2 including a concave reflective surface 12b, and Conditional Expressions of $0.7 \le |Rl|/Ll \le 1.5$ and $2 \le |Rm|/Lm \le 7$ are satisfied, where a curvature radius of the refractive surface 11a is Rl (mm), a distance between the refractive surface 11a and the aperture diaphragm 3 is Ll (mm), a curvature radius of the reflective surface 12b is Rm (mm), and a distance between the aperture diaphragm 3 and the reflective surface 12b is Lm (mm).

19 Claims, 24 Drawing Sheets

(51) Int. Cl.
  *B60T 7/22*   (2006.01)
  *B60T 8/17*   (2006.01)
  *G02B 13/18*   (2006.01)
  *H04N 5/225*   (2006.01)

(56) References Cited

FOREIGN PATENT DOCUMENTS

| | | |
|---|---|---|
| JP | 2003-116029 A | 4/2003 |
| JP | 2007-60158 A | 3/2007 |
| JP | 2008-249838 A | 10/2008 |
| JP | 2009-145541 A | 7/2009 |
| JP | 2009-223330 A | 10/2009 |
| JP | 2009-300994 A | 12/2009 |
| JP | 2011-95026 A | 5/2011 |
| JP | 2013-210549 A | 10/2013 |
| JP | 2014-174390 A | 9/2014 |
| WO | WO-2017150486 A1 * | 9/2017 ............... H04N 5/74 |

* cited by examiner

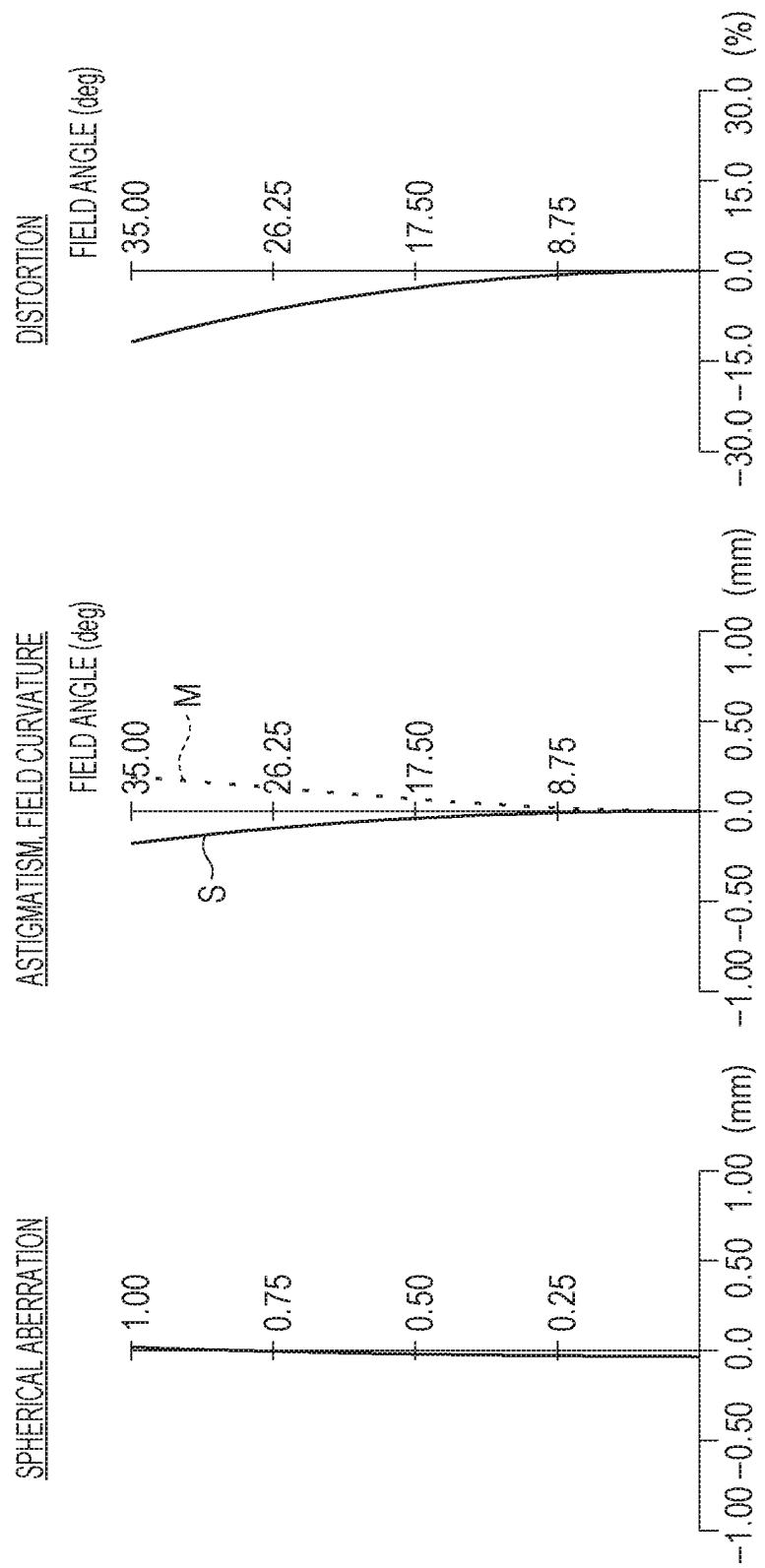

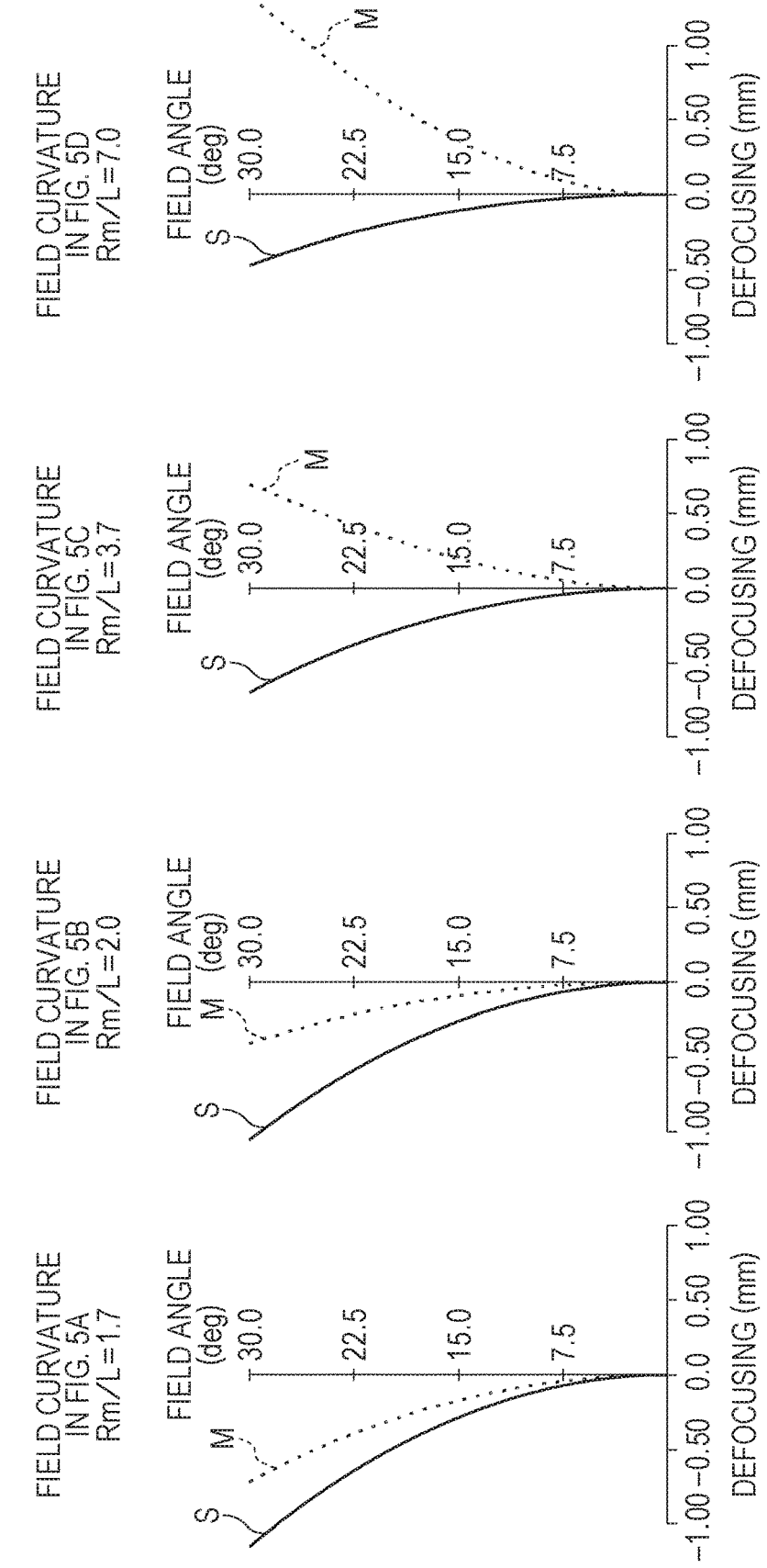

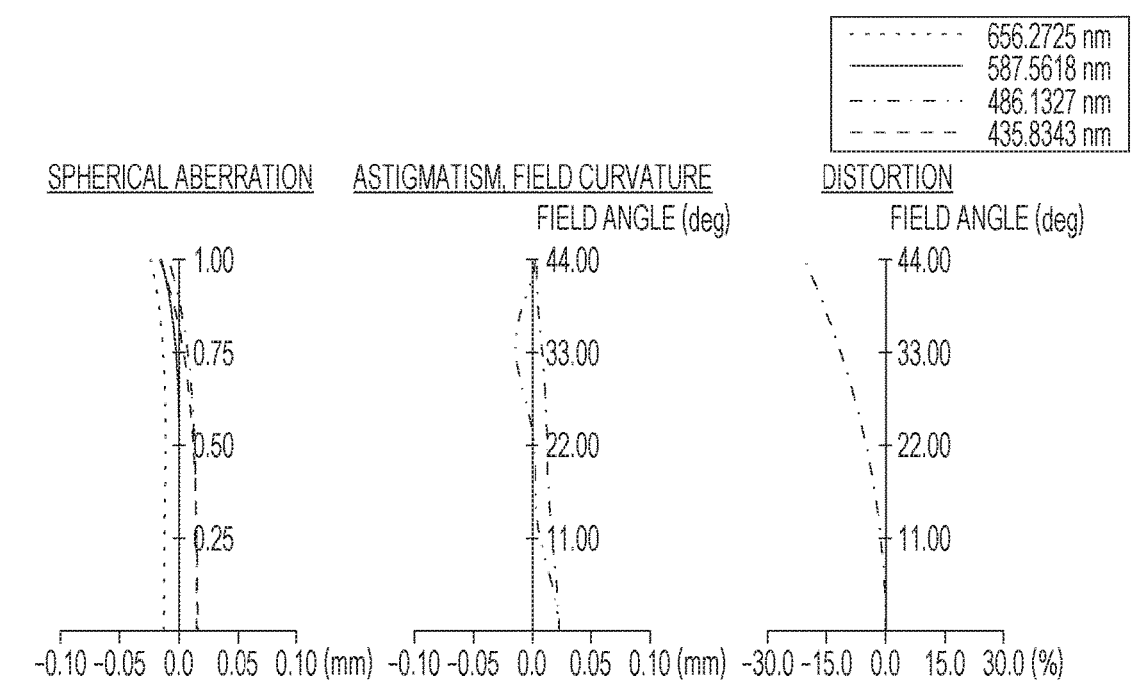

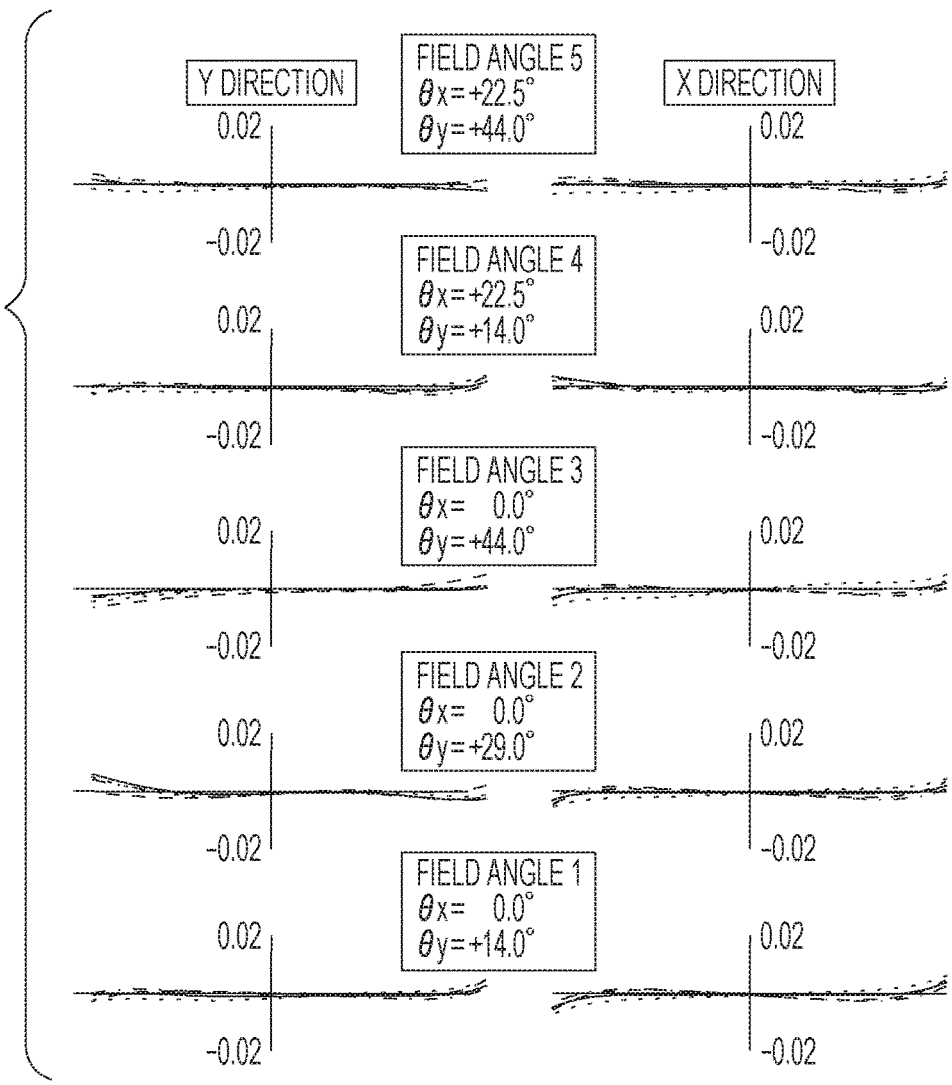

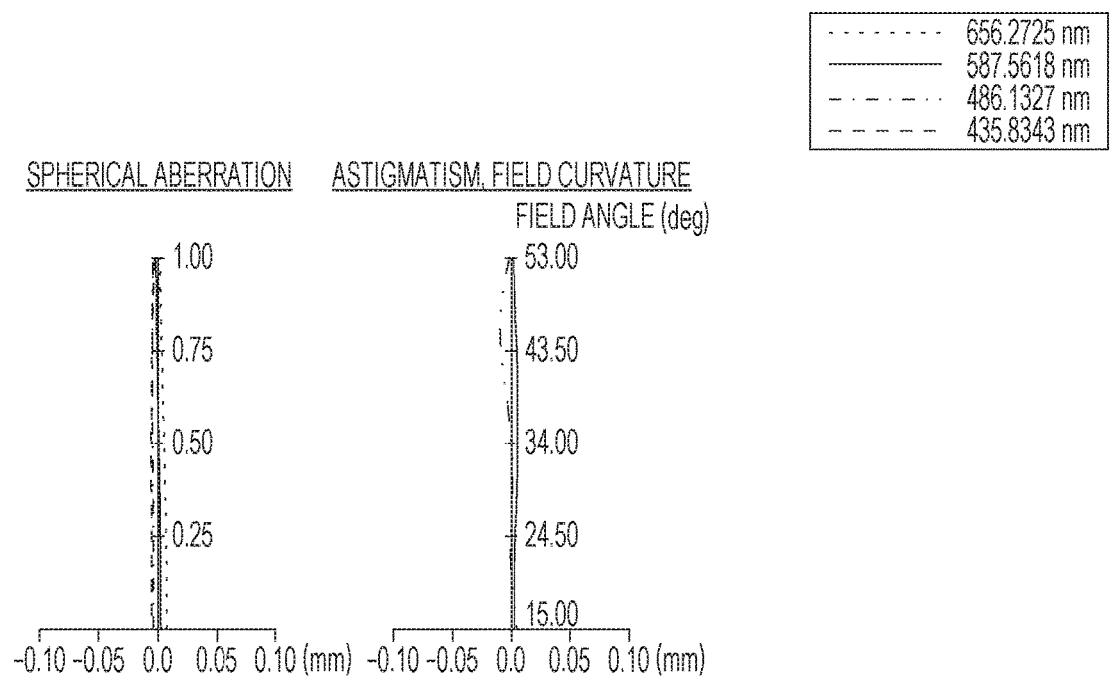

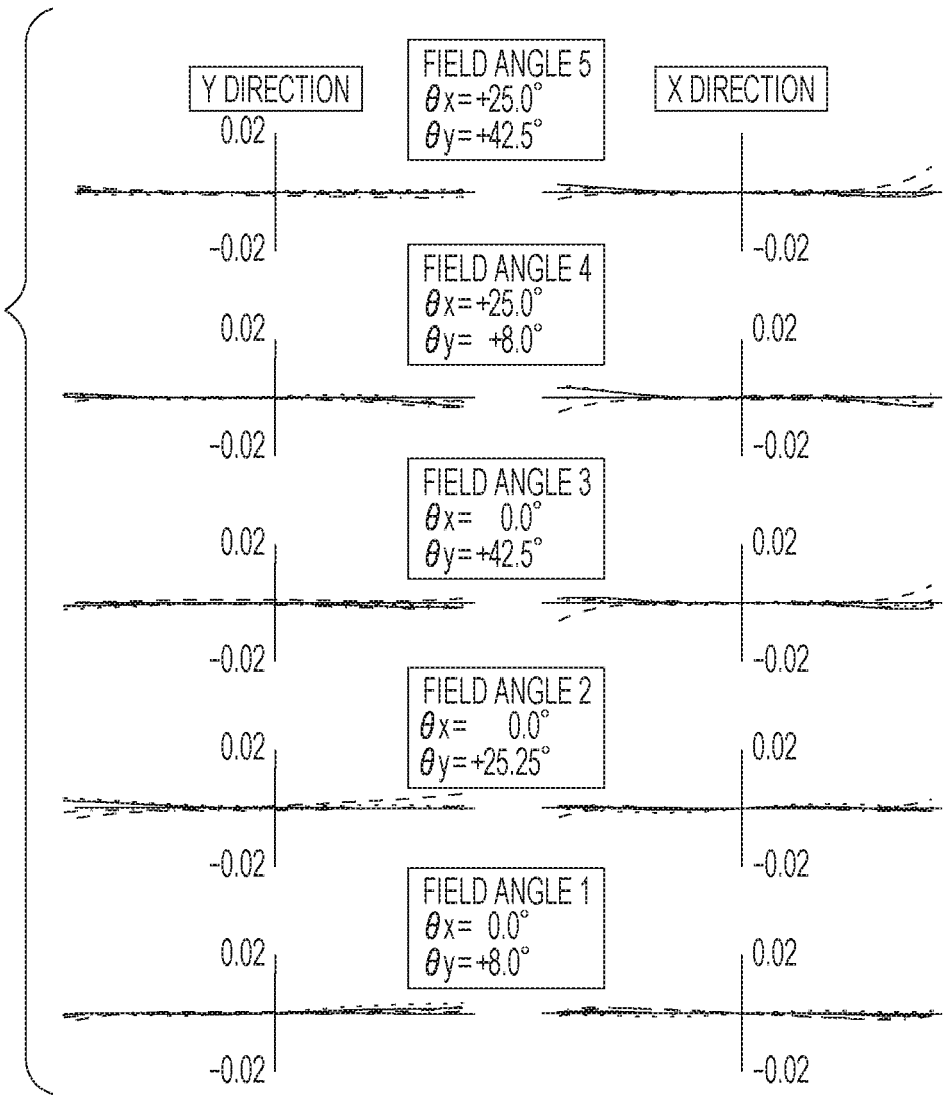

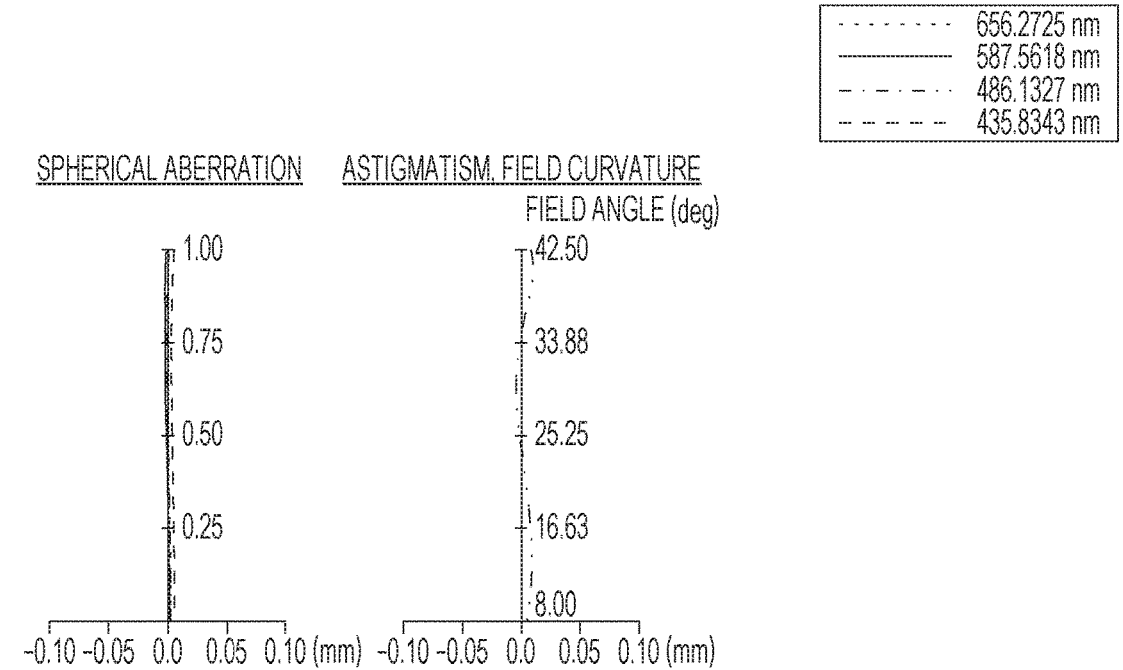

OPTICAL SYSTEM, AND IMAGING APPARATUS AND PROJECTING APPARATUS HAVING THE SAME

CROSS-REFERENCE TO RELATED APPLICATIONS

This application is a Continuation of International Patent Application No. PCT/JP2017/007614, filed Feb. 28, 2017, which claims the benefit of Japanese Patent Application No. 2016-042686, filed Mar. 4, 2016, both of which are hereby incorporated by reference herein in their entirety.

TECHNICAL FIELD

The present invention relates to an optical system having a refractive surface and a reflective surface, that is favorably used in imaging apparatuses such as digital still cameras and digital video cameras, cameras for cellular phones, surveillance cameras, wearable cameras, medical cameras, and so forth, and projecting apparatuses such as projectors and so forth, for example.

BACKGROUND ART

In recent years, there has been demand for an optical system used in imaging apparatuses and projecting apparatuses that has high resolution over a wide field angle and that is small in size.

PTL 1 describes an imaging apparatus that has a spherical lens. According to this spherical lens, on-axis aberration such as spherical aberration and axial chromatic aberration can be corrected favorably while suppressing occurrence of off-axis aberrations such as comatic aberration, astigmatism, lateral chromatic aberration, and so forth, and thus an optical system that has high resolution over a wide field angle can be realized.

PTL 2 describes an optical system having a lens with a convex surface toward the object side and a catadioptric lens having a concave inner reflective surface, whereby a wide field angle can be realized.

CITATION LIST

Patent Literature

PTL 1 Japanese Patent Laid-Open No. 2013-210549
PTL 2: Japanese Patent Laid-Open No. 2009-300994

However, the imaging plane of the spherical lens according to PTL 1 is spherical, so a spherical imaging device or display device, or light guide means where one end is spherical and the other end is a planar surface, becomes necessary in a case of providing this spherical lens to an imaging apparatus or projecting apparatus. Consequently, the overall apparatus increases in complexity and size, leading to higher costs.

Also, it is difficult to favorably correct aberration while keeping the f-number low with the optical system according to PTL 2, and accordingly realizing both reduction in size and high resolution is difficult.

SUMMARY OF INVENTION

Accordingly, it is an object of the present invention to provide an optical system that can realize reduction in size and high resolution over a wide field angle in imaging apparatuses and projecting apparatuses.

In order to achieve the above object, an optical system according to an aspect of the present invention includes, in order from an enlargement side, a front group, an aperture diaphragm, and a rear group. The front group includes a refractive surface convex toward the enlargement side, the rear group includes a concave reflective surface, and Conditional Expressions of $0.7 \leq |Rl|/Ll \leq 1.5$ and $2 \leq |Rm|/Lm \leq 7$ are satisfied, where a curvature radius of the refractive surface is Rl (mm), a distance between the refractive surface and the aperture diaphragm is Ll (mm), a curvature radius of the reflective surface is Rm (mm), and a distance between the aperture diaphragm and the reflective surface is Lm (mm).

Further features of the present invention will become apparent from the following description of exemplary embodiments with reference to the attached drawings.

BRIEF DESCRIPTION OF DRAWINGS

FIG. 2 is a diagram of longitudinal aberration of the optical system according to the first example.

FIG. 6 is a diagram illustrating the relation between reflective surface and field curvature.

FIGS. 14A and 14B are diagrams of aberration of the optical system according to the third example.

FIGS. 16A and 16B are diagrams of aberration of the optical system according to the fourth example.

FIGS. 19A and 19B are diagrams of aberration of the optical system according to the fifth example.

DESCRIPTION OF EMBODIMENTS

Figure 1:
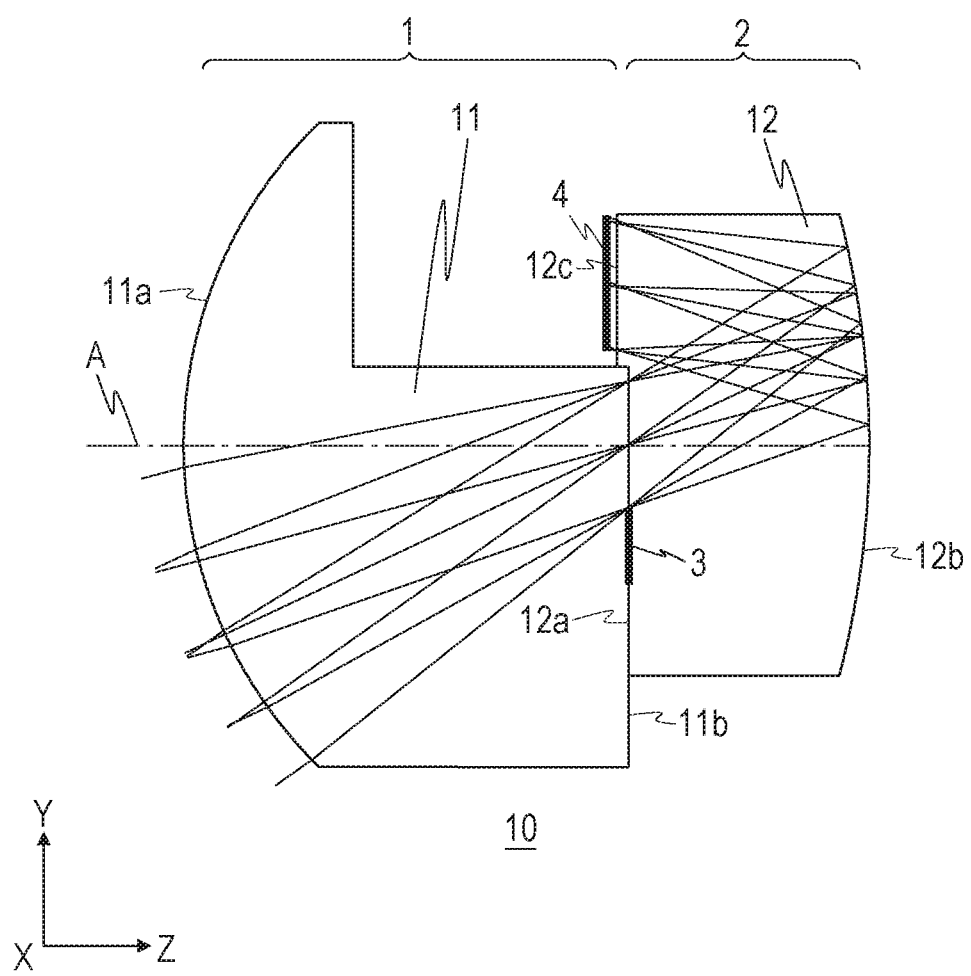
FIG. 1 is a schematic diagram of principal portions of an optical system according to a first example of the present invention.

Preferable embodiments of the present invention will be described below with reference to the drawings. The drawings may be drawn according to scales different from actual scales, for the sake of convenience. Parts that are the same in the drawings are denoted with the same reference numerals, and redundant description will be omitted.

First Example

FIG. 1 is a schematic diagram of principal portions of an optical system 10 according to a first example of the present invention, in a YZ cross-section including an optical axis A. The optical system 10 according to the present Example is an imaging optical system that collects light fluxes from an object that is omitted from illustration, and forms an image of the object. The optical system 10 can be applied to imaging apparatus and projecting apparatuses.

In a case where the optical system 10 is applied to an imaging apparatus as an imaging optical system, an imaging surface of an imaging device such as a CCD sensor, CMOS sensor, or the like, is disposed at the position of the image plane (reduction plane) 4 of the optical system 10. In a case where the optical system 10 is applied to a projecting apparatus as a projecting optical system, a display surface of a display device such as a liquid crystal panel (spatial modulator) or the like is disposed at the position of the reduction plane 4. Note however, that the object side and image side are opposite between imaging optical systems and projecting optical systems, and the optical path is reversed. A case where the optical system 10 is applied to an imaging apparatus is assumed in the following description.

Regarding Configuration of Optical System 10

The optical system 10 is configured including an aperture diaphragm 3 that restricts the width of light flux, a front group 1 that is an optical element group disposed further toward the object side (enlargement side) than the aperture diaphragm 3, and a rear group 2 that is an optical element group disposed further toward the image side (reduction side) than the aperture diaphragm 3. In the present Example. The front group 1 is made up of an optical element 11 including a refractive surface 11a that is convex toward the object side, and the rear group 2 is made up of an optical element 12 including a reflective surface 12b that is concave toward the incident light.

The first optical element 11 is a plano-convex lens having two optical surfaces through which effective light flux that contribute to imaging pass. A first surface 11a serving as the optical plane (plane of incidence) closest to the object side of the first optical element 11 is a spherical surface that is convex toward the object side, and a second surface 11b serving as the optical plane (plane of emission) closest to the image side is a planar surface. Note that unnecessary portions of the first optical element 11 where effective light flux does not pass are cut away, as illustrated in FIG. 1, in order to dispose an imaging device or display device at the position of the image plane 4.

The second optical element 12 is a catadioptric lens having three optical surfaces. A first surface 12a of the second optical element 12 serving as the surface of incidence is a planar surface, the second surface 12b has an aspheric surface that is concave toward the image side, and a third surface 12c serving as the plane of emission is a planar surface. The first optical element 11 and second optical element 12 are both made up of a material having a refractive index of Nd=1.51608 and an Abbe number of vd=64.1. and are integrated by being joined to each other. The aperture diaphragm 3 is provided to the surface of junction of the first optical element 11 and second optical element 12.

Table 1 illustrates specification values of the optical system 10 according to the present Example. Note that in Table 1, the second surface 11b of the first optical element 11, the first surface 12a of the second optical element 12, and the aperture diaphragm 3, are represented as being the same surface. Also note that "frontmost surface" in Table 1 indicates an "optical surface closest to the object side".

TABLE 1

Table 1: Configuration of Optical System 10 According to First Example

| Surface No. | Surface Name | Symbol | | Surface type | | Curvature radius R (mm) | Inter-surface distance d (mm) | Refractive index Nd | Abbe number vd | Length to aperture diaphragm L (mm) | Curvature center position |
|---|---|---|---|---|---|---|---|---|---|---|---|
| 1 | First optical element | First surface | 11a | Spherical | Refractive surface | 10.0000 | 10.000 | 1.51608 | 64.10 | 10.000 | 0.000 |
| 2 | First optical element | Second surface | 11b | Planar | Refractive surface | ∞ | 5.405 | 1.51608 | 64.10 | | |
| | Aperture diaphragm | | 3 | | | | | | | | |
| | Second optical element | First surface | 12a | | | | | | | | |
| 3 | Second optical element | Second surface | 12b | Spherical | Reflective surface | −20.0000 | −5.670 | 1.51608 | 64.10 | 5.405 | |
| 4 | Second optical element | Third surface | 12c | Planar | Refractive surface | ∞ | −0.100 | Air | | | |
| 5 | Light receiving surface | | 4 | Planar | | ∞ | 0.000 | | | | |

TABLE 1-continued

Table 1: Configuration of Optical System 10 According to First Example

|  | Start surface | End surface | Focal Length (mm) | Power | Power ratio (entire system) |
|---|---|---|---|---|---|
| Entire system | Surface No. 1 | Surface No. 4 | 8.1 | 0.124 | 1.00 |
| Frontmost surface through short of reflective surface | Surface No. 1 | Surface No. 2 | 19.3 | 0.052 | 0.42 |
| Reflective surface | Surface No. 3 | Surface No. 3 | 10.0 | 0.100 | 0.81 |

|  | Inter-surface distance (mm) |
|---|---|
| Frontmost surface through aperture diaphragm | 10.00 |
| Frontmost surface through entrance pupil | 10.00 |
| Aperture diaphragm through entrance pupil Lp | 0.00 |

Light flux from an object, omitted from illustration, is transmitted through the first surface 11a and second surface 11b of the first optical element 11, and pass through the opening of the aperture diaphragm 3. Part of the light flux is shielded by a shielding portion of the aperture diaphragm 3 at this time, so the light flux width is restricted. The light flux that has passed through the aperture diaphragm 3 is transmitted through the first surface 12a of the second optical element 12, reflected at the second surface 12b and transmitted through the third surface 12c, and forms a planar image plane 4. The image plane 4 is formed at the same side (−Z side) as the aperture diaphragm 3 with regard to the reflective surface 12b in the present Example, as illustrated in FIG. 1.

With regard to the optical system 10 according to the present Example, the field angle (horizontal field angle) within a ZX cross-section (first cross-section) is θx=30° (θx=−15° to +15°), and the field angle (vertical field angle) within a YZ cross-section (second cross-section) is θy=20° (θy=+15° to +35°). That is to say, while the horizontal field angle is set symmetrically on both sides of an optical axis A, the vertical field angle is only set on one side (the + side) of the optical axis A.

Thus, a configuration can be made where the imaging surface of the imaging device disposed at the image plane 4 only receives the light flux entering the optical system 10 from the opposite side from the imaging device as to the optical axis A, by arranging for light flux to obliquely enter each optical surface of the optical system 10 in the YZ cross-section. In a projecting apparatus, a configuration can me made where light flux from the display surface of the display device disposed at the image plane 4 only exits from the opposite side from the display device as to the optical axis A in the YZ cross-section of the optical system 10. This enables the imaging device or display device to be prevented from interfering with the optical elements and the light paths.

Also, the aperture value (f-number) of the optical system 10 according to the present Example is F=2.0, so the optical system 10 according to the present Example is an optical system that has a wide field angle and the f-number is small (bright). The aberrations of the optical system 10 are also corrected well, as illustrated in FIG. 2. Specifically, the optical system 10 obtains high imaging performance over a wide field angle by the refractive surface 11a, and corrects curvature of the imaging surface due to the refractive surface 11a, by the reflective surface 12b. This will be described below in detail.

Regarding Front Group 1

The refractive surface 11a of the front group 1 according to the present Example has a shape where the distance to the aperture diaphragm 3 and the radius of curvature is generally equal (point symmetrical shape). Specifically, the shape of the refractive surface 11a satisfies the following Conditional Expression (1) when the curvature radius of the refractive surface 11a is Rl (mm) and the distance between the refractive surface 11a and the aperture diaphragm 3 is Ll (mm).

$$0.7 \leq |Rl|/Ll \leq 1.5 \quad (1)$$

Note that "distance" indicates "distance on the optical axis A" unless specifically indicated otherwise. The optical axis A is an axis that passes through the center (surface apex) of the optical surfaces that have power in the optical system 10, and the center of the aperture diaphragm 3. Deviating from the range in Conditional Expression (1) results in increase in the amount of off-axis aberration occurring, and good optical properties cannot be obtained. This will be described below.

Generally, when designing an optical system, correction of off-axis aberrations such as comatic aberration, astigmatism, field curvature, distortion, and lateral chromatic aberration and so forth, and on-axis aberration such as spherical aberration and axial chromatic aberration, is necessary. However, in a case of using a general axis-symmetrically shaped lens, a great amount of off-axis aberration occurs at the fringe field (off-axis), so the optical performance is the highest on the optical axis, and the optical performance at the fringe field deteriorates in comparison.

On the other hand, a point-symmetrical lens surface has generally the same shape from the optical axis to the fringe field, so occurrence of off-axis aberrations such as comatic aberration, astigmatism, lateral chromatic aberration, and so forth can be suppressed, and deterioration of optical performance at the fringe field can be suppressed. Accordingly, the number of aberrations to be corrected can be restricted by employing a point-symmetrical lens surface, and thus on-axis aberration can be corrected well even with a simple configuration. As a result, an optical system that is small in size and has high resolution over a wide field angle can be realized while reducing the aperture value.

Figure 3A:
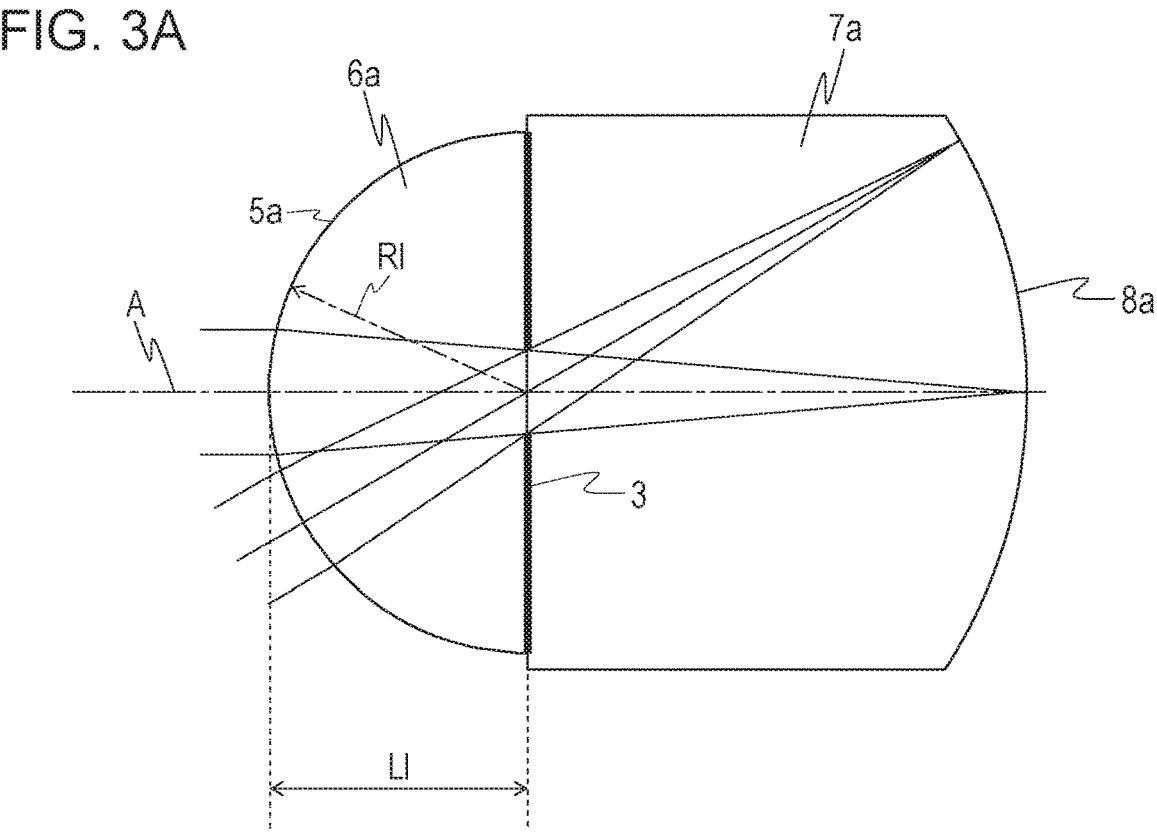
FIGS. 3A and 3B are diagrams for describing behavior of a refractive surface having a point symmetry shape.
Figure 3B:
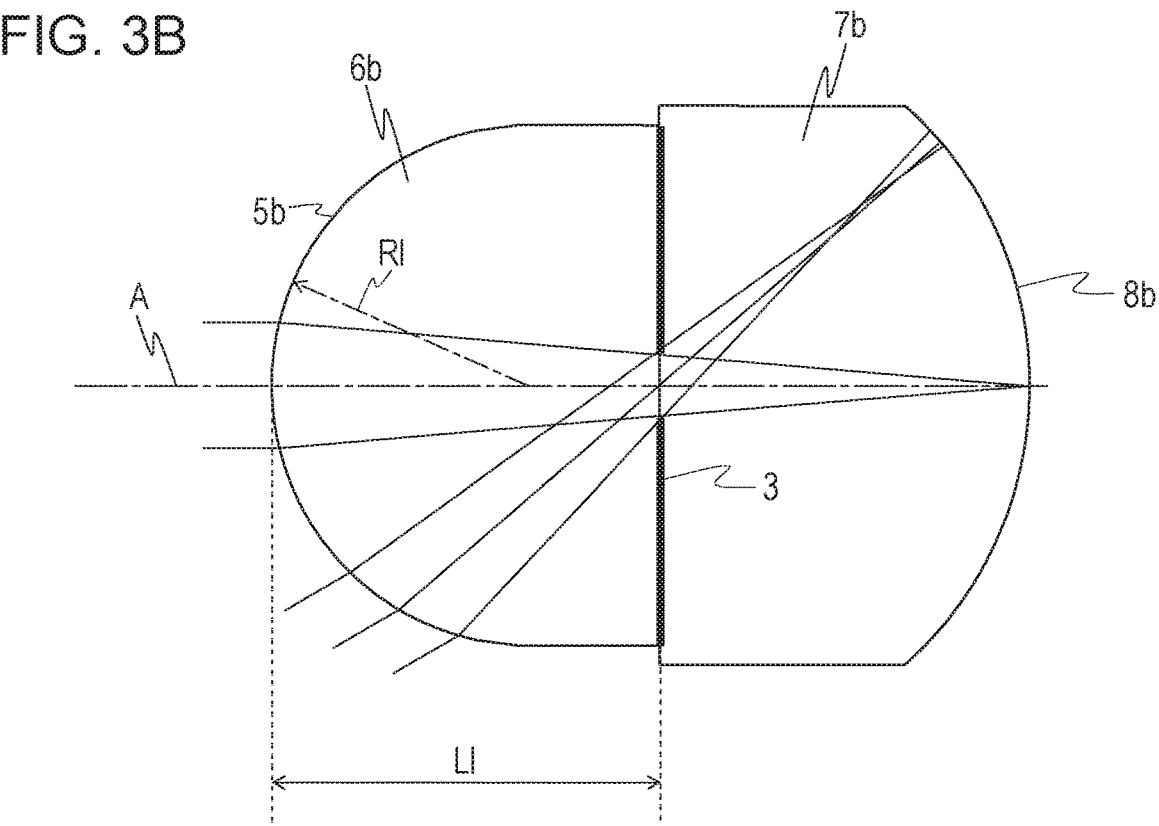

FIGS. 3A and 3B are diagrams for describing behavior of a point-symmetrically shaped refractive surface, illustrating the way in which a light flux passing through lenses 6a and 6b is collected via the aperture diaphragm 3. The lenses 6a and 6b respectively include lens surfaces 5a and 5b having a curvature radius Rl=10.0000 mm, which is the same as the refractive surface 11a according to the present Example. The refractive index of the lenses 6a and 6b, and the refractive index of mediums 7a and 7b further toward the image side from the aperture diaphragm 3, is Nd=1.51608, which is the same as the refractive index of the first optical element 11 and second optical element 12 according to the present Example. Note that FIGS. 3A and 3B only illustrate light fluxes at field angle s 0° and +30°.

In FIG. 3A, the light flux passing through the lens surface 5a is collected via the aperture diaphragm 3 and medium 7a, and forms an imaging surface 8a of which the curvature radius is 20.000 mm. The distance between the lens surface 5a and the aperture diaphragm 3 is Ll=10.000 mm, which is the same as the optical system 10 according to the present Example, so Conditional Expression (1) is satisfied due to |Rl|/Ll=1.00 mm. It can be clearly seen from the drawing here that the offset as to the spherical surface of the imaging surface 8a and astigmatism are zero, and comatic aberration also is almost zero.

On the other hand, in FIG. 3B, the distance between the lens surface 5b and the aperture diaphragm 3 is Ll=15.000 mm, unlike the optical system 10 according to the present Example, so Conditional Expression (1) is not satisfied due to |Rl|/Ll=0.67. It can be clearly seen from the drawing here that great comatic aberration and offset as to the spherical surface of the imaging surface 8a occurs at field angle +30°.

Figure 4:
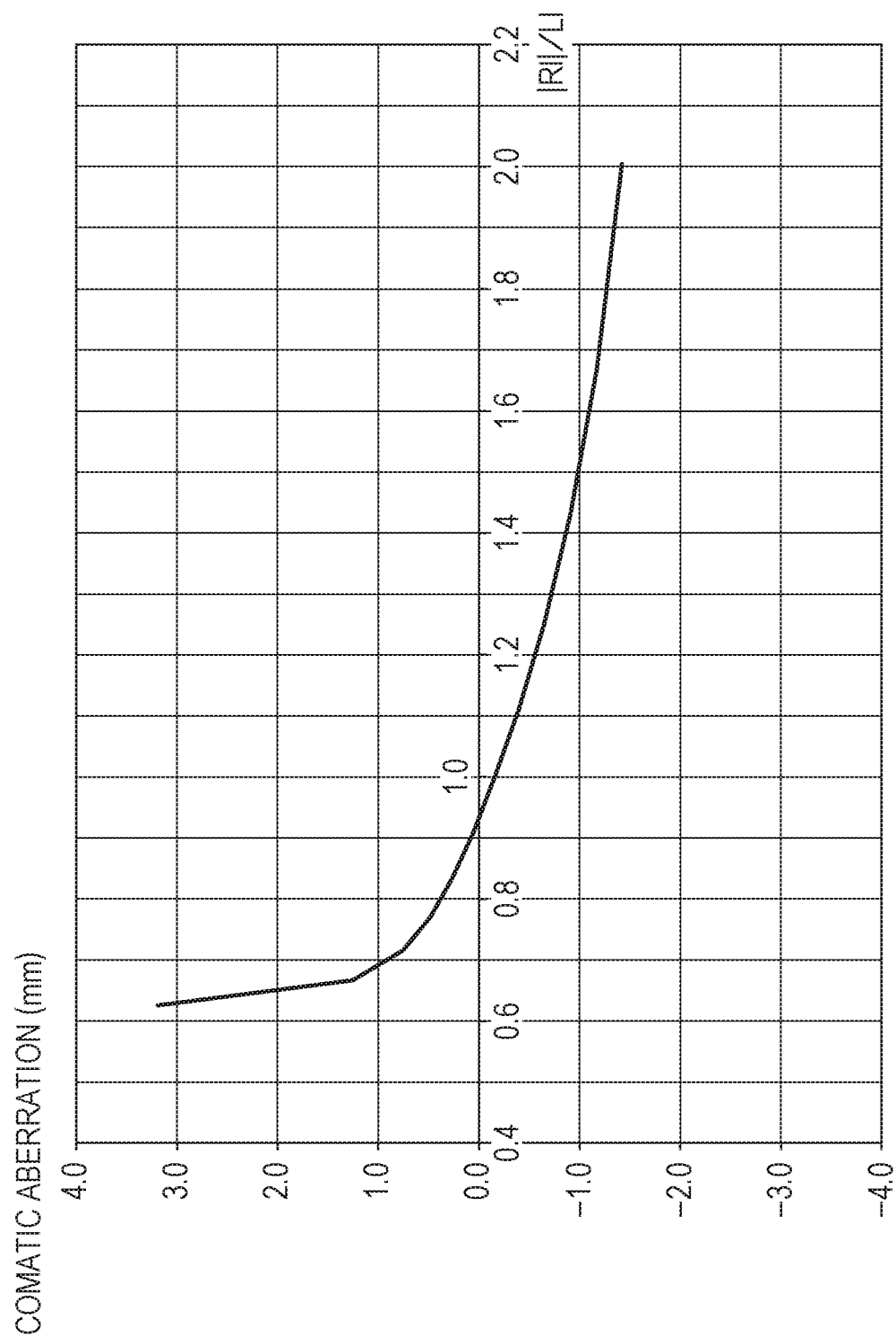
FIG. 4 is a diagram for describing the effects of Conditional Expression (1).

FIG. 4 is a diagram illustrating the relation between the value of |Rl|/Ll in Conditional Expression (1) and comatic aberration. In FIG. 4, the horizontal axis represents the value of |Rl|/Ll, and the vertical axis represents the amount of comatic aberration (mm) occurring at the imaging surface. It can be clearly seen in the graph that the comatic aberration is smallest around |Rl|/Ll=1.0, and that the comatic aberration increases the farther away from |Rl|/Ll=1.0. It can be seen that a particularly great amount of comatic aberration occurs in a case below |Rl|/Ll=0.7 and above |Rl|/Ll=1.5.

Thus, the present Example enables occurrence of off-axis aberration to be suppressed by the shape of the refractive surface 11a being a point-symmetrical shape that satisfies Conditional Expression (1). Further, satisfying the following Conditional Expression (1') is even more preferable.

$$0.8 \leq |Rl|/Ll \leq 1.3 \quad (1')$$

Regarding Rear Group 2

The reflective surface 12b according to the present Example acts to correct field curvature. Specifically, the shape of the reflective surface 12b satisfies the following Conditional Expression (2) when the curvature radius of the reflective surface 12b is Rm (mm) and the distance between the aperture diaphragm 3 and the reflective surface 12b is Lm (mm).

$$2 \leq |Rm|/Lm \leq 7 \quad (2)$$

When exceeding the upper limit value of Conditional Expression (2), field curvature increases and good imaging performance is not obtainable. Also, when falling below the lower limit value of Conditional Expression (2), the imaging device or display device disposed at the image plane 4 interferes with the optical paths. This will be described below.

FIGS. 5A through 5D are diagrams for describing the behavior of a concave reflective surface, illustrating the way in which light fluxes that have passed through the aperture diaphragm 3 and been reflected at reflective surfaces 9a, 9b, 9c, and 9d are collected at the image plane 4, assuming that the front group is not present. The reflective surfaces 9a, 9b, 9c, and 9d each have a curvature radius of Rm=−20.0000 mm, which is the same as the reflective surface 12b according to the present Example. Note that only the light fluxes of field angles +10°, +20°, and +30° are illustrated in FIGS. 5A through 5D.

Figure 5A:
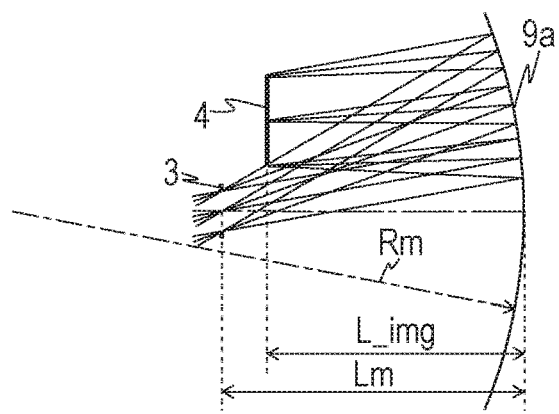
FIGS. 5A through 5D are diagrams for describing behavior of a concave-shaped reflective surface.
Figure 5B:
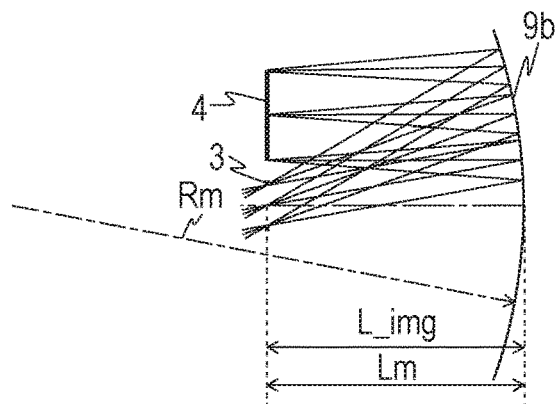

In FIG. 5A, the distance between the aperture diaphragm 3 and reflective surface 9a on the optical axis A is Lm=11.765 mm, which is different from the optical system 10 according to the present Example, so Conditional Expression (2) is not satisfied due to |Rm|/Lm=1.7. In FIG. 5B, the distance between the aperture diaphragm 3 and reflective surface 9b on the optical axis A is Lm=10.000 mm, which is different from the optical system 10 according to the present Example, but Conditional Expression (2) is satisfied due to |Rm|/Lm=2.0.

Figure 5C:
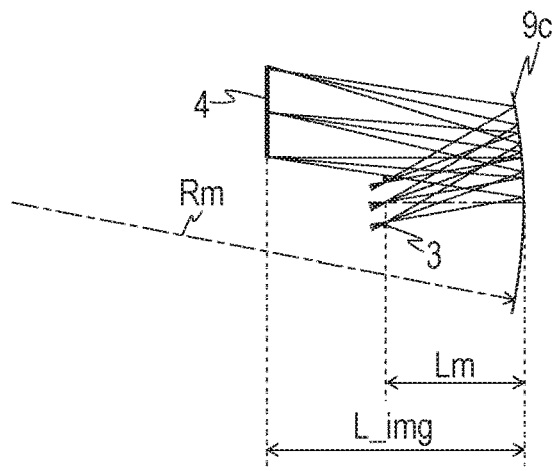
Figure 5D:
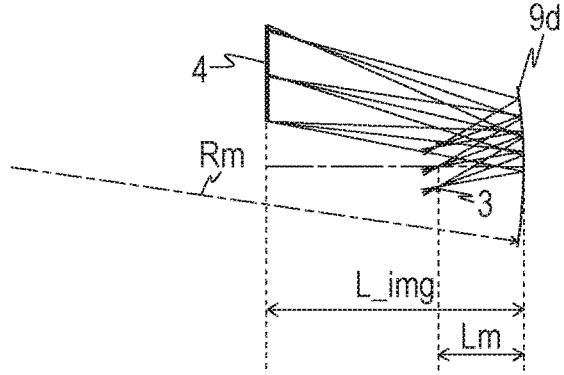

In FIG. 5C, the distance between the aperture diaphragm 3 and reflective surface 9c on the optical axis A is Lm=5.405 mm, which is the same as the optical system 10 according to the present Example, but Conditional Expression (2) is satisfied due to |Rm|/Lm=3.7. In FIG. 5D, the distance between the aperture diaphragm 3 and reflective surface 9d on the optical axis A is Lm=3.333 mm, which is different from the optical system 10 according to the present Example, but Conditional Expression (2) is satisfied due to |Rm|/Lm=7.0.

Now, in FIG. 5C, the light fluxes reflected at the reflective surface 9c are collected to the image plane 4 at a position ½ of the curvature radius Rm from the reflective surface 9c. That is to say, the distance from a point on the reflective surface 9c on the optical axis A to the image plane 4 in the optical axis direction is L_img=10.000 mm, which is longer than the distance Lm between the aperture diaphragm 3 and the reflective surface 9c. In the same way, the distance L_img is longer than the distance Lm in FIG. 5D as well. The distance L_img and the distance Lm are the same in FIG. 5B.

Now, configurations can be made so that the light fluxes from the aperture diaphragm 3 heading toward the reflective surfaces 9b, 9c, and 9d do not interfere with the image plane 4. Accordingly, when applying the reflective surfaces 9b, 9c, and 9d to an imaging apparatus or projecting apparatus, sufficient region to dispose the imaging device or display device can be secured. Note that in FIG. 5D, the vertical field angle is preferably set such that the light fluxes from the reflective surface 9d heading toward the image plane 4 do not interfere with the aperture diaphragm 3. On the other hand, in FIG. 5A, the distance L_img is shorter than the distance Lm, so part of the image plane 4 will overlap the light fluxes from the aperture diaphragm 3 heading toward the reflective surface 9a.

Figure 7:
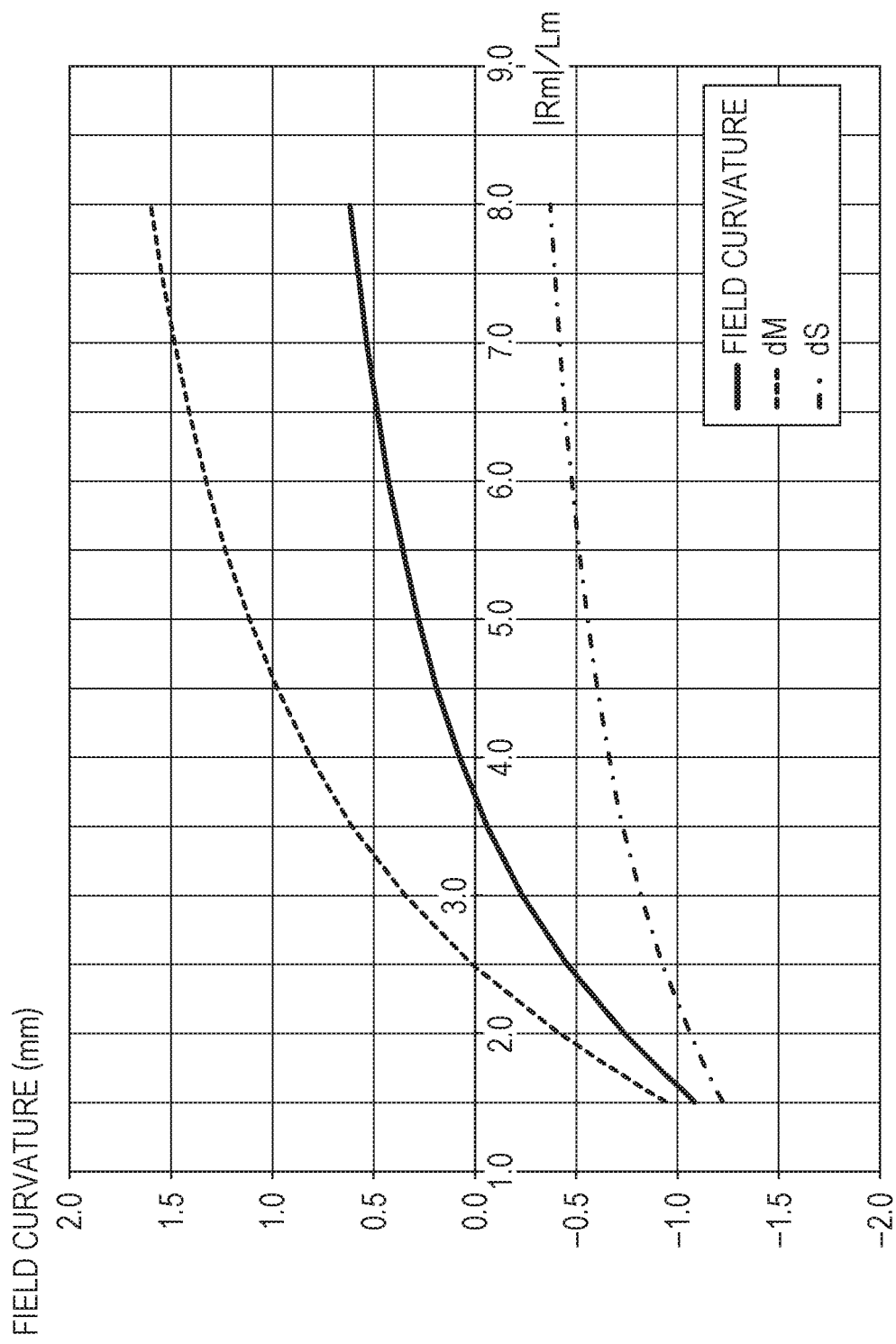
FIG. 7 is a diagram for describing the effects of Conditional Expression (2).

FIG. 6 is a diagram illustrating field curvature at the image plane 4 in in each of FIGS. 5A through 5D. FIG. 7 is a diagram illustrating the relation between the value of |Rm|/Lm and field curvature in Conditional Expression (2). The horizontal axis in FIG. 7 represents the value of |Rm|/Lm, and the vertical axis represents the amount of field curvature (mm) occurring at the image plane 4.

It can be clearly seen from FIGS. 6 and 7 that when |Rm|/Lm=3.7, the meridional field curvature amount dM and the sagittal field curvature amount dS are distributed to either side of the image plane, so the amount of field curvature at an average image plane at an intermediate position between the meridional image plane and the sagittal image plane is approximately zero. When |Rm|/Lm exceeds 3.7, the amount of field curvature increases in the positive direction, and the amount of field curvature exceeds+0.5 mm around |Rm|/Lm=7.0, while the meridional field curvature amount dM reaches+1.5 mm.

Thus, according to the present Example, field curvature can be favorably corrected while avoiding interference between the image plane 4 and optical paths, by the shape of the reflective surface 12b being a shape that satisfies Conditional Expression (2). Further, satisfying the following Conditional Expression (2') is even more preferable.

$$2.5 \leq |Rm|/Lm \leq 5 \quad (2')$$

Figure 8:
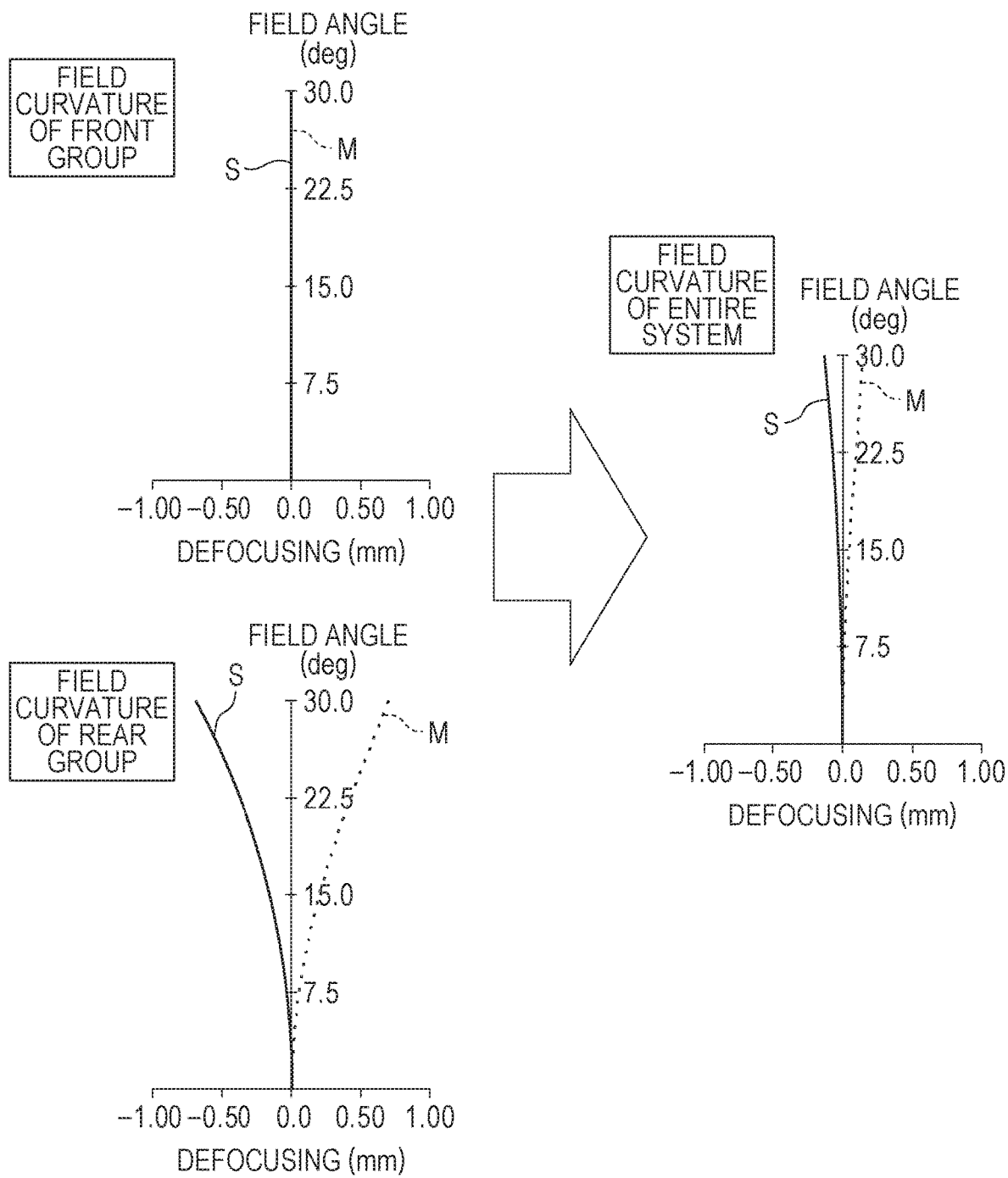
FIG. 8 is a diagram illustrating field curvature of a front group, rear group, and overall system, according to the first example.

FIG. 8 is a diagram illustrating the field curvature of the front group 1, rear group 2, and overall system, in the optical system 10 according to the present Example. Note that the field curvature of the front group 1 represents offset of the actual imaging plane as to an ideal spherical imaging plane from a point-symmetrical shape lens surface (curvature radius R=−19.3498 mm). The front group 1 exhibits field curvature as to a flat plane, but the field curvature as to a spherical surface is zero, as illustrated in FIG. 8, and astigmatism also is zero. The rear group 2 exhibits great meridional field curvature and sagittal field curvature as to an ideal planar image plane, but the field curvature of the average image plane is zero.

The entire system of the optical system 10 exhibits shapes of meridional field curvature and sagittal field curvature that are the same as the field curvature of the rear group 2, as illustrated in FIG. 8, and the field curvature of the average image plane is zero. Not only that, the absolute values of meridional field curvature and sagittal field curvature are suppressed to small values for the entire system.

Thus, according to the optical system 10, meridional field curvature and sagittal field curvature can be corrected by the refractive surface 11a that satisfies Conditional Expression (1), and field curvature of an average image plane can be corrected by the reflective surface 12b that satisfies Conditional Expression (2). That is to say, the spherical primary image plane formed by the front group 1 is taken as an object plane, and is re-imaged by the rear group 2, thereby enabling field curvature at the planar image plane 4 can be favorably corrected.

Although a configuration is employed in the present Example where each of the front group 1 and rear group 2 are made up of a single optical element, these may each be made up of multiple optical elements as necessary. In doing so, multiple refractive surfaces and reflective surfaces may be provided. In this case as well, the advantages of the present invention can be obtained by a configuration where at least one of the multiple refractive surfaces satisfies Conditional Expression (1), and at least one of the multiple reflective surfaces satisfies Conditional Expression (2).

Now, each of the front group 1 and rear group 2 in the optical system 10 according to the present Example have positive power. According to the optical system 10, field curvature can be favorably corrected just by optical elements having positive power, so the overall system can be made to have positive power without increasing the positive power of individual groups. Accordingly, the power of each optical surface can be reduced, and thus suppress the amount of aberration occurring. The power of the front group 1 is set to be stronger than the power of the rear group 2 in the optical system 10. Accordingly, in a case where the power of the entire system is constant, the distance from the aperture diaphragm 3 to the image plane 4 can be set to be longer as compared to a case where the power of the rear group 2 is set weaker than the power of the front group 1, so the image plane 4 can be disposed so as not to interfere with the light flux.

Also, the following Conditional Expression (3) is preferably satisfied, where ff is the focal length of an optical part (optical element group) from the optical surface closest to the object surface in the optical system 10 (the refractive surface 11a of the first optical element 11) to the optical surface immediately short of the reflective surface 12b (the second surface 11b of the first optical element 11). Note however, in a case where the rear group 2 has multiple reflective surfaces, it is sufficient for the reflective surface thereof that has the greatest power to satisfy Conditional Expression (3).

$$0.5 \leq |Rm|/ff \leq 2 \quad (3)$$

Satisfying Conditional Expression (3) enables field curvature to be favorably corrected by the reflective surface 12b, while avoiding interference between the image plane 4 and optical path. When falling below the lower limit value of Conditional Expression (3), there is a possibility of interference between the image plane 4 and optical path. Also, when exceeding the upper limit value of Conditional Expression (3), there is a possibility that the effects of correcting field curvature by the reflective surface 12b cannot be sufficiently obtained. In the present Example, ff=19.3 mm and Rm=−20.0000 mm, so Conditional Expression (3) is satisfied since |Rm|/ff=1.04.

Also, the following Conditional Expression (4) is preferably satisfied, where f is the focal length of the entire system of the optical system 10. Note however, in a case where the rear group 2 has multiple reflective surfaces, it is sufficient for the reflective surface thereof that has the greatest power to satisfy Conditional Expression (4).

$$0.25 \leq f/|Rm| \leq 0.45 \quad (4)$$

When falling below the lower limit value of Conditional Expression (4), there is a possibility of interference between the image plane 4 and optical path. Also, when exceeding the upper limit value of Conditional Expression (4), there is a possibility that the effects of correcting field curvature by the reflective surface 12b cannot be sufficiently obtained. In the present Example, f−8.1 mm and Rm=−20.0000 mm, so Conditional Expression (4) is satisfied since f/|Rm|=0.41.

Also, the optical system 10 is preferably configured such that the center point of the aperture diaphragm 3 and the center point of the entrance pupil (enlargement side pupil) are in close proximity with each other. Specifically, the following Conditional Expression (5) is preferably satisfied where Lp (mm) is the distance between the aperture diaphragm 3 and the entrance pupil.

$$0.0 \leq Lp/f \leq 0.2 \quad (5)$$

Satisfying Conditional Expression (5) enables a concentric configuration where light rays of various field angles enter the point-symmetrically shaped refractive surface at angles close to perpendicular, which facilitates correction of aberration by the point-symmetrically shaped refractive surface. Exceeding the upper limit value of Conditional Expression (5) results in deviating from a concentric configuration, and the effects of the point-symmetrically shaped refractive surface cannot be sufficiently obtained. In the present Example, the distance between the aperture diaphragm 3 and the entrance pupil is Lp=0.00 mm, so Lp/f=0.00, and Conditional Expression (5) is satisfied.

Table 2 shows the values of Conditional Expressions (1) through (5) in the optical system 10 according to the present Example.

TABLE 2

Table 2: Conditional Expressions (First Example)

| | |
|---|---|
| Conditional Expressions (1), (1') \|R1\|/L1 | 1.000 (Surface No. 1) |
| Conditional Expressions (2), (2') \|Rm\|/Lm | 3.700 (Surface No. 3) |
| Conditional Expressions (3) \|Rm\|/ff | 1.04 (Surface No. 3) |
| Conditional Expressions (4) f/\|Rm\| | 0.41 (Surface No. 3) |
| Conditional Expressions (5) Lp/f | 0.00 |

Thus, according to the optical system 10 of the present Example, high resolution can be realized over a wide field angle with a simple and small configuration. In a case where the optical system 10 is applied to an imaging apparatus or projecting apparatus, the image plane 4 can be made to be planar in shape, so reduction in the size of the overall apparatus can be realized.

Second Example

Figure 9:
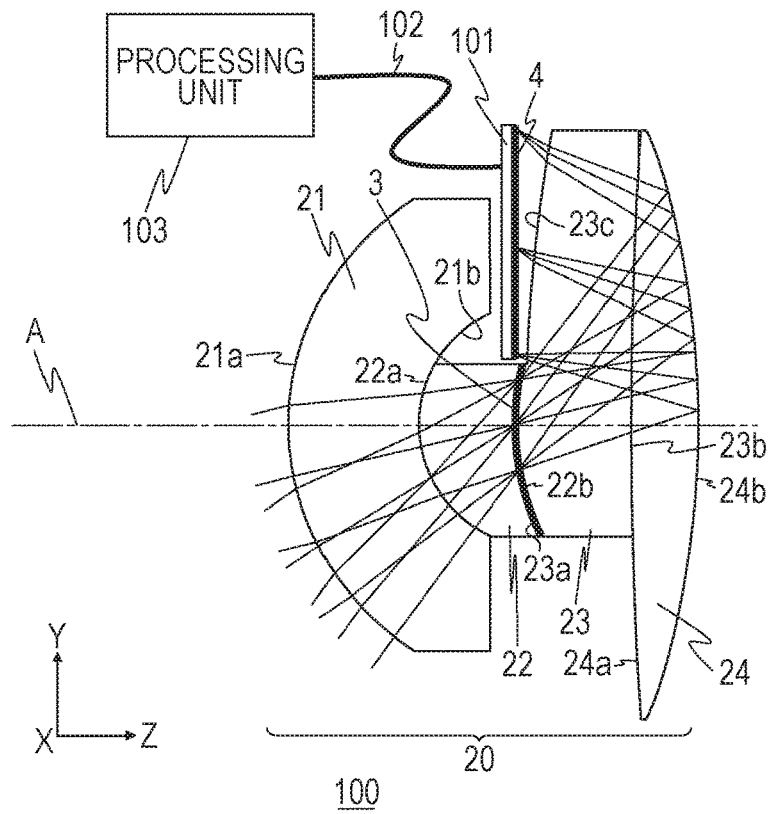
FIG. 9 is a schematic diagram of principal portions of an imaging apparatus according to a second example of the present invention.

FIG. 9 is a schematic diagram of principal portions of an imaging apparatus 100 having an optical system 20 according to a second Example of the present invention, in a YZ cross-section including the optical axis A.

The imaging apparatus 100 includes the optical system 20 serving as an imaging optical system, an imaging element 101, a cable 102, and a processing unit 103. In the imaging apparatus 100, the optical system 20 collects optical flux from a subject omitted from illustration, and images the subject on the image plane (light receiving plane) 4 of the imaging element 101. The imaging element 101 performs photoelectric conversion of the image of the subject formed by the optical system 20, and outputs electric signals. The processing unit 103 processes the electric signals from the imaging element 101 transferred via the cable 102, and obtains image data of the subject.

Figure 10:
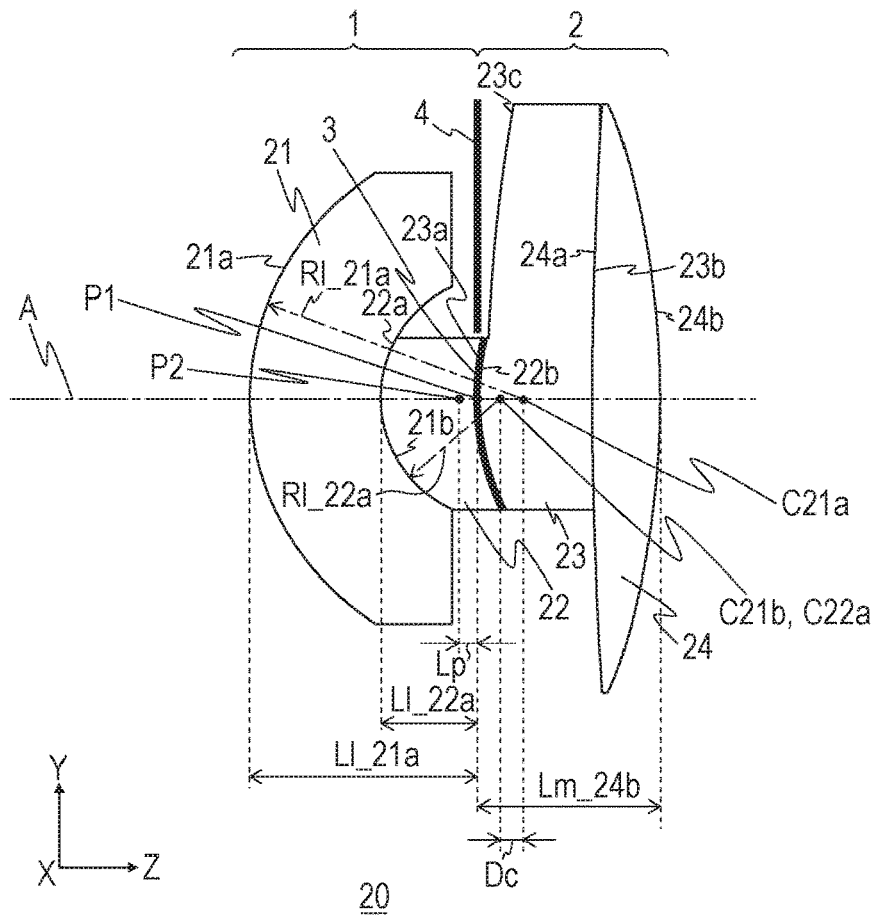
FIG. 10 is a schematic diagram of principal portions of an optical system according to the second example.

FIG. 10 is a schematic diagram of principal portions of the optical system 20 in a YZ cross-section including the optical axis A. Unlike the first Example, the optical system 20 according to the present Example has four optical elements that are joined to each other. Specifically, in the optical system 20, the front group 1 that is further toward the subject side than the aperture diaphragm 3 includes a first optical element 21 and a second optical element 22 in that order from the object side, and the rear group 2 that is further toward the image side than the aperture diaphragm 3 includes a third optical element 23 and a fourth optical element 24 in that order from the object side. The aperture diaphragm 3 is provided at the junction surface of the second optical element 22 and third optical element 23.

In the front group 1, the first optical element 21 is an aspheric lens having a first surface 21a that is an aspheric surface and a second surface 21b that is a spherical surface, and the second optical element 22 is a spherical surface having a first surface 22a and second surface 22b that are both spherical. In the rear group 2, the third optical element 23 is a lens having first surface 23a, second surface 23b, and third surface 23c, each of which are spherical, and the fourth optical element 24 is a lens having a first surface 24a that is spherical and a second surface 24b that is aspheric. Note that the second surface 24b of the fourth optical element 24 is an inner reflective surface where a reflective film has been formed.

The surface apex of each of the optical surfaces that the optical system 20 according to the present Example has is on the optical axis A. Note that while the third surface 23c of the third optical element 23 does not intersect the optical axis A, the shape thereof is a partial cutout of a spherical surface having a surface apex on the optical axis A (the optical axis A and the center axis match). Also note that in the present Example, aspheric surfaces are rotation-symmetrically shaped center on the optical axis A, and are expressed with the following aspheric surface expression.

Here, z is sagitta (mm) of the aspherical shape in the optical axis direction, c is the curvature (1/mm) at the optical axis A, k is a conic constant, r is distance (mm) in the radial direction from the optical axis A, and A through G are respectively aspheric surface coefficients of the fourth term through the 16th term. Note that in this aspheric surface expression, the first term indicates the sage of the base spherical surface, the curvature radius of this base spherical surface being R=1/c. The second term and following terms indicate the sagittal of aspheric components imparted to the base spherical surface.

Note that in the present Example, in a case where an optical surface is aspheric, the curvature radius of the base spherical surface is used as the curvature radius of that optical surface, and the configuration is such that this curvature radius satisfies the Conditional Expressions. Note however, that the paraxial curvature radius of the aspheric surface shape may be used as the curvature radius. Also, an intersection between a surface normal and the optical axis A at a certain position may be deemed to be the center of curvature of the optical surface, taking into local curvature of the aspheric surface.

Table 3 illustrates specification values of the optical system 20 according to the present Example. Note that in Table 3, optical surfaces that are joined to each other are represented as being the same surface. The aperture diaphragm 3 that is provided to a junction surface between optical surfaces is also represented as being the same as the function surface.

TABLE 3

Table 3: Configuration of Optical System 20 According to Second Example

| Surface No. | Surface Name | Symbol | | Surface type | | Curvature radius R | Inter-surface distance d | Refractive index Nd | Abbe number vd | Length to aperture diaphragm L | Curvature center position Dc | Power of surface φ1 |
|---|---|---|---|---|---|---|---|---|---|---|---|---|
| 1 | First optical element | First surface | 21a | Aspheric | Refractive surface | 24.3155 | 12.000 | 1.92119 | 24.0 | 21.3461 | 0.0000 | 0.038 |
| 2 | First optical element | Second surface | 21b | Spherical | Refractive surface | 11.8959 | 9.346 | 1.67790 | 55.3 | 9.3461 | 0.4196 | −0.020 |
| | Second optical element | First surface | 22a | | | | | | | | | |

TABLE 3-continued

Table 3: Configuration of Optical System 20 According to Second Example

| | | | | | | | | | | | | |
|---|---|---|---|---|---|---|---|---|---|---|---|---|
| 3 | Second optical element | Second surface | 22b | Spherical | Refractive surface | 15.8236 | 12.000 | 1.60863 | 46.6 | 0.0000 | 12.8543 | −0.004 |
| | Aperture diaphragm | | 3 | | surface | | | | | | | |
| | Third optical element | First surface | 23a | | | | | | | | | |
| 4 | Third optical element | Second surface | 23b | Spherical | Refractive surface | 90.0982 | 6.562 | 1.62041 | 60.3 | 12.0000 | 99.1288 | 0.000 |
| | Fourth optical element | First surface | 24a | | surface | | | | | | | |
| 5 | Fourth optical element | Second surface | 24b | Aspheric | Reflective surface | −77.9645 | −6.562 | 1.62041 | 60.3 | 18.5623 | | |
| 6 | Fourth optical element | First surface | 24a | Spherical | Refractive surface | 90.0982 | −10.000 | 1.60863 | 46.6 | | | |
| | Third optical element | Second surface | 23b | | surface | | | | | | | |
| 7 | Third optical element | Third surface | 23c | Spherical | Refractive surface | 100.1456 | −1.000 | Air | | | | |
| 8 | Light receiving surface | | 4 | Planar | | ∞ | | | | | | |

| Coefficient Item | | Value |
|---|---|---|
| Aspheric Surface Coefficients (Surface No. 1) | | |
| Conic constant | K | −2.27421E−01 |
| 4th-order coefficient | A | 1.17917E−06 |
| 6th-order coefficient | B | 1.48940E−09 |
| 8th-order coefficient | C | 5.63951E−13 |
| 10th-order coefficient | D | 1.66412E−15 |
| 12th-order coefficient | E | 0.00000E+00 |
| 14th-order coefficient | F | 0.00000E+00 |
| 16th-order coefficient | G | 0.00000E+00 |
| Aspheric Surface Coefficients (Surface No. 5) | | |
| Conic constant | K | −1.35136E+00 |
| 4th-order coefficient | A | 4.99534E−07 |
| 6th-order coefficient | B | −1.59303E−09 |
| 8th-order coefficient | C | −7.32390E−12 |
| 10th-order coefficient | D | 5.10788E−14 |
| 12th-order coefficient | E | −1.19504E−16 |
| 14th-order coefficient | F | 0.00000E+00 |
| 16th-order coefficient | G | 0.00000E+00 |

| | Start surface | End surface | Focal Length (mm) | Power | Power ratio (entire system) |
|---|---|---|---|---|---|
| Entire system | Surface No. 1 | Surface No. 7 | 27.0 | 0.037 | 1.00 |
| Frontmost surface through short of reflective surface | Surface No. 1 | Surface No. 4 | 51.2 | 0.020 | 0.53 |
| Reflective surface | Surface No. 5 | Surface No. 5 | 39.0 | 0.026 | 0.69 |

| | Inter-surface distance (mm) |
|---|---|
| Frontmost surface through aperture diaphragm | 21.35 |
| Frontmost surface through entrance pupil | 19.59 |
| Aperture diaphragm through entrance pupil Lp | 1.76 |

The light flux from the unshown subject passes through the first optical element 21 and second optical element 22, and thereafter is restricted by the shielding portion of the aperture diaphragm 3. The light flux that has passed through the aperture portion of the aperture diaphragm 3 passes through the first surface 23a and second surface 23b of the third optical element 23 and the first surface 24a of the fourth optical element 24, in that order, and is reflected at the second surface 24b of the fourth optical element 24. The reflected light flux is transmitted through the first surface 24a of the fourth optical element 24 again, transmitted through the second surface 23b and third surface 23c of the third optical element 23 in that order, and forms the image plane 4 that is planar in shape.

In the optical system 20, three optical surfaces that the front group 1 has, which are the first surface 21a of the first optical element 21, the second surface 21b of the first optical element 21, and the first surface 22a of the second optical element 22, are point-symmetrically shaped refractive surfaces that satisfy Conditional Expression (1). According to this configuration, occurrence of off-axis aberration can be suppressed.

Specifically, with regard to the refractive surface 21a, the curvature radius of the base spherical surface is R1=24.3155 mm and the distance as to the center point P1 of the aperture diaphragm 3 on the optical axis A is L1=21.3461 mm, so |R1|/L1=1.14, and thus Conditional Expressions (1) and (1') are satisfied. Also, with regard to the refractive surfaces 21b and 22a, the curvature radius of the base spherical surface is R1=11.8959 mm and the distance as to the center point P1 of the aperture diaphragm 3 on the optical axis A is L1=9.3461 mm, so |R1|/L1=1.27, and thus Conditional Expressions (1) and (1') are satisfied.

Note that in a case where there are multiple refractive surfaces that satisfy Conditional Expression (1) as in the present Example, the following Conditional Expression (6) is preferably satisfied where the distance between the center of curvature of the refractive surface that is closest to the object side and the center of curvature of another refractive surface is Dc (mm) and the focal length of the entire system is f (mm).

$$0.0 \leq Dc/f \leq 0.1 \quad (6)$$

Satisfying Conditional Expression (6) enables the positions of the centers of curvature of each of the point-symmetrically shaped refractive surfaces to be brought closer, so the amount of occurrence of comatic aberration can be suppressed even further. When the upper limit value of Conditional Expression (6) is exceeded, comatic aberration occurs due to each of the point-symmetrically shaped refractive surfaces, and realization of high resolution becomes difficult. The distance between the curvature center C21a of the refractive surface 21a and the curvature centers C21b and C22a of the refractive surfaces 21b and 22a is Dc=0.4196 mm in the present embodiment, and the focal length of the entire system is f=27.0 mm, so Dc/f=0.016, and thus Conditional Expression (6) is satisfied.

Also, in a case of employing a refractive surface satisfying Conditional Expression (1) as in the present embodiment, a refractive surface having negative power is preferably provided. In the optical system 20 according to the present Example, the junction surface between the second surface 21b of the first optical element 21 and the first surface 22a of the second optical element 22, and the junction surface between the second surface 22b of the second optical element 22 and the first surface 23a of the third optical element 23 are refractive surfaces having negative power. These refractive surfaces having negative power enable on-axis aberration occurring at the refractive surface 21a having positive power to be favorably corrected.

At this time, the refractive surface having negative power is preferably disposed between the refractive surface 21a closes to the object side and the refractive surface 24b. Further, the refractive surface having negative power even more preferably has a point-symmetrical shape that satisfies Conditional Expression (1), and preferably satisfies the following Conditional Expression (7) where the negative power thereof is φ1 and the power of the entire system is φ.

$$\phi1/\phi \leq -0.27 \quad (7)$$

Employing a refractive surface having a strong negative power satisfying Conditional Expression (7) facilitates correction of on-axis aberration, such as spherical aberration and axial chromatic aberration. Even in a case of employing a refractive surface having such a strong negative power, on-axis aberration can be favorably corrected while suppressing occurrence of comatic aberration and astigmatism by the refractive surface having a point-symmetrical shape. In the present embodiment, the power of the refractive surfaces 21b and 22a is φ1=−0.020 and the power of the entire system is φ=0.037, so it can be seen that the refractive surfaces 21b and 22a satisfying Conditional Expression (1) satisfy Conditional Expression (7), since φ1/φ=−0.552.

On the other hand, the power of the refractive surfaces 22b and 23a that do not satisfy Conditional Expression (1) is φ1=−0.04, and Conditional Expression (7) is not satisfied since φ1/φ=0.118. Accordingly, the negative power of refractive surfaces that are not point-symmetrically shaped preferably is set to be weaker than the range indicated by Conditional Expression (7), and thus axial chromatic aberration can be corrected favorably while suppressing occurrence of comatic aberration.

In the optical system 20 according to the present Example, the horizontal field angle is θx=30° (θx=−15° through +15°), the vertical field angle is θy=20° (θy=+14° through +34°), and the aperture value is F=2.0. Thus, employing a refractive surface having a point-symmetrical shape enables the aberrations to be favorably corrected, and high resolution to be realized, even in a bright optical system with a wide field angle. Note that an optical surface of which difference in refractive index as to an adjacent medium is great, i.e., the optical surface closest to the object side (the optical surface that comes into contact with air) is preferably a point-symmetrically shaped refractive surface, as in the present Example.

The fourth optical element 24 that the rear group 2 has in the present Example is a catadioptric lens, having the first surface 24a that is a refractive surface and the second surface 24b that is a reflective surface, as illustrated in FIG. 10. The reflective surface 24b is a concave reflective surface. The reflective surface 24b is aspheric, being defined by the aspheric surface expression above, and has a shape where the fringe portion is largely deformed toward the side opposite to the image plane 4 as compared to the optical axis A, from the concave base spherical surface. Specifically, the curvature radius of the base spherical surface of the reflective surface 24b is Rm=−77.9645 mm, the distance as to the center point P1 of the aperture diaphragm 3 on the optical axis A is Lm=18.5623 mm, so Conditional Expressions (2) and (2') are satisfied since |Rm|/Lm=4.20.

Also in the present Example, the focal length of the optical part from the optical surface closest to the object side (refractive surface 21a) to the optical surface immediately short of the reflective surface 24b (refractive surface 23b) is ff=51.2 mm, so |Rm|/ff=1.52 holds, and thus Conditional Expression (3) is satisfied. Also, f/|Rm|=0.35 holds, so Conditional Expression (4) is satisfied. Further, in the present embodiment as well, the center point P1 of the aperture diaphragm 3 and the center point P2 of the entrance pupil are in close proximity as illustrated in FIG. 10, and Conditional Expression (5) is satisfied since Lp=1.756 mm and Lp/f=0.07.

In the optical system 20 according to the present Example, the optical surfaces 22b and 23a closest to the aperture diaphragm 3 have negative power (φ1=−0.004). At the optical surfaces 22b and 23a disposed near to the aperture diaphragm 3, the principal rays of the optical fluxes of each field angle pass through around the center of each optical surface, but marginal rays of the optical fluxes of each field angle pass through at positions away from the center of each optical surface. Accordingly, even if the optical surfaces 22b and 23a are imparted negative power, the principal rays of each field angle are hardly refracted at all, so occurrence of lateral chromatic aberration can be suppressed, and axial chromatic aberration can be corrected. Further, this configuration enables the distance from the aperture diaphragm 3 to the image plane 4 to be increased, thereby facilitating avoidance of interference between the image plane 4 and optical paths.

Table 4 shows the values of Conditional Expressions (1) through (7) in the optical system 20 according to the present Example.

TABLE 4

Table 4: Conditional Expressions (Second Example)

| Conditional Expressions (1), (1') |R|/L| | 1.139 (Surface No. 1) | 1.273 (Surface No. 2) |
| --- | --- | --- |

TABLE 4-continued

Table 4: Conditional Expressions (Second Example)

| | |
|---|---|
| Conditional Expressions (2), (2') \|Rm\|/Lm | 4.200 (Surface No. 5) |
| Conditional Expressions (3) \|Rm\|/ff | 1.52 (Surface No. 5) |
| Conditional Expressions (4) f/\|Rm\| | 0.35 (Surface No. 5) |
| Conditional Expressions (5) Lp/f | 0.07 |
| Conditional Expressions (6) Dc/f | 0.016 (Surface No. 2) |
| Conditional Expressions (7) φl/φ | −0.552 (Surface No. 2) |

Figure 11:
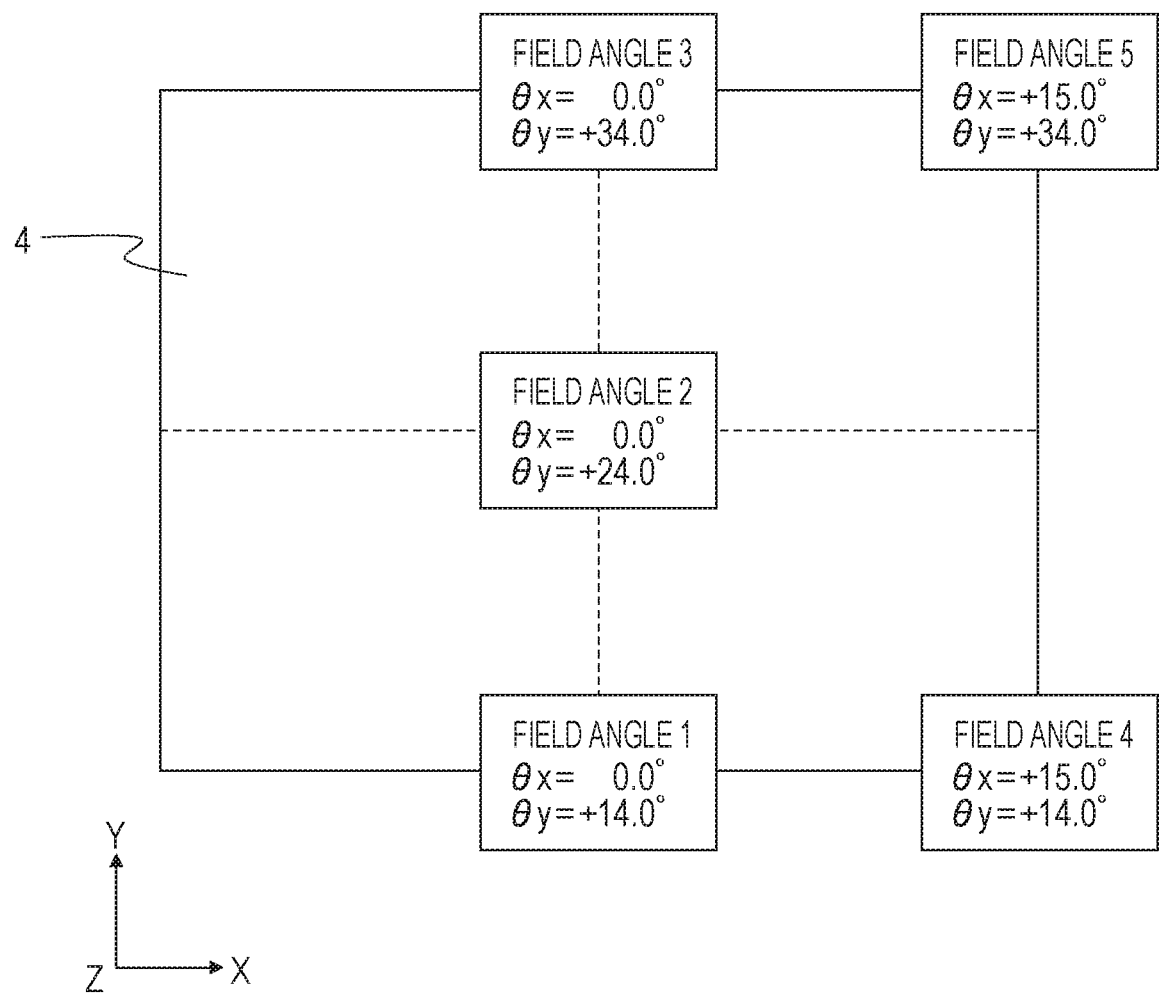
FIG. 11 is a diagram illustrating field angles on an imaging plane.

FIG. 11 is a diagram illustrating the field angles corresponding to five positions of the image plane 4 of the imaging device 101. Field angle 1 is a field angle that has a center field angle θx=0° in the horizontal direction (X direction) and a smallest field angle θy=+14° in the vertical direction (Y direction), i.e., is a field angle corresponding to the center lower edge of the image plane 4. Field angle 2 is a field angle that has a center field angle θx=0° in the horizontal direction and a center field angle θy=+24° in the vertical direction, i.e., is a field angle corresponding to the center of the image plane 4. Field angle 3 is a field angle that has a center field angle θx=0° in the horizontal direction and a largest field angle θy=+34° in the vertical direction, i.e., is a field angle corresponding to the center upper edge of the image plane 4. Field angle 4 and field angle 5 are field angles that have a largest field angle θx=+15° in the horizontal direction and a smallest field angle θy=+14° and largest field angle θy=+34° in the vertical direction, i.e., are field angles corresponding to the lower right and upper right edges of the image plane 4.

Figure 12A:
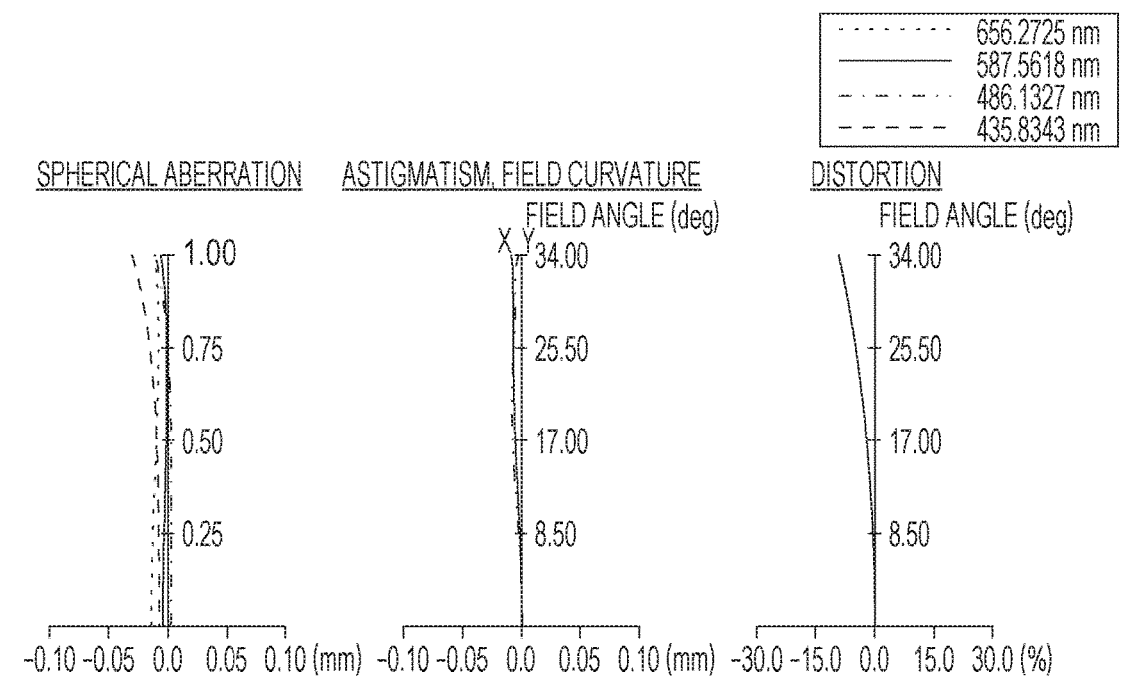
FIGS. 12A and 12B are diagrams of aberration of the optical system according to the second example.
Figure 12B:
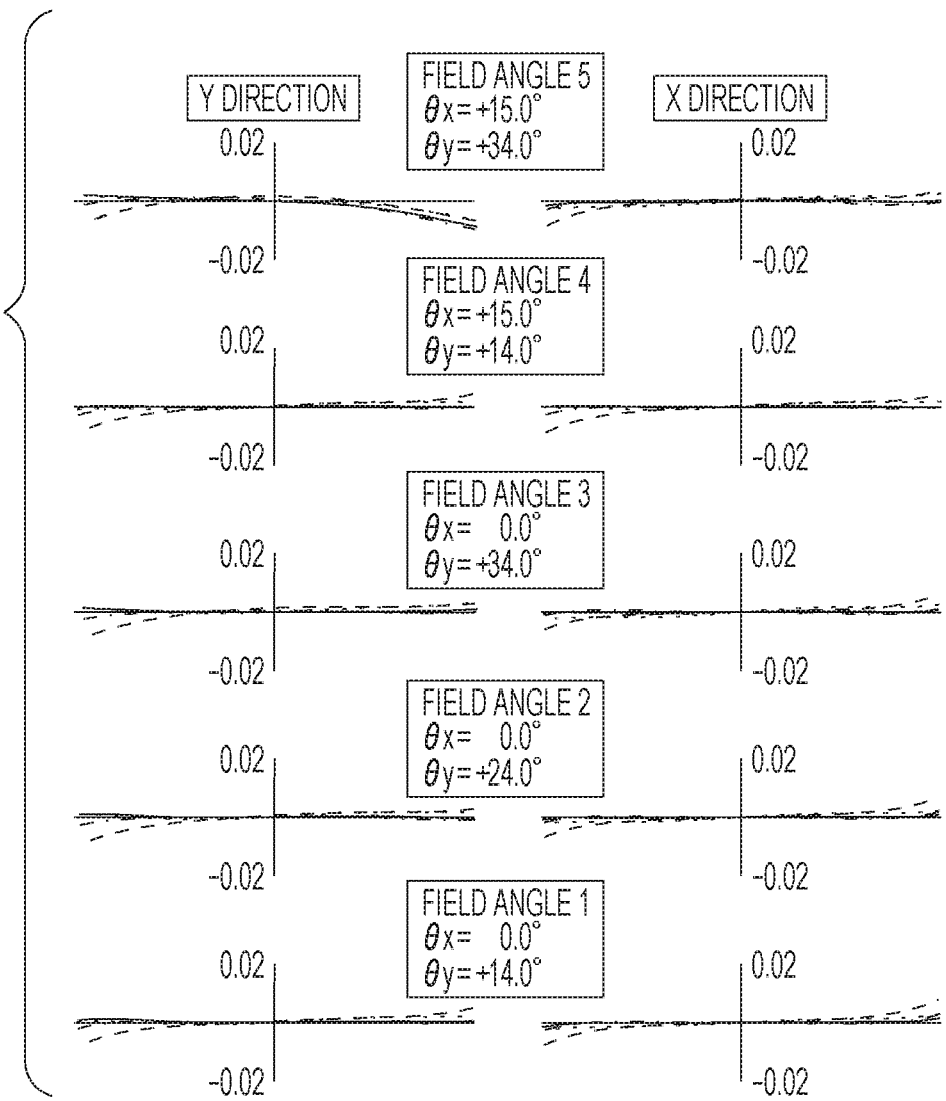

FIGS. 12A and 12B are aberration diagrams regarding the optical system 20, where FIG. 12A is a longitudinal aberration diagram and FIG. 12B is a lateral aberration diagram. FIG. 12A illustrates spherical aberration regarding each of a C ray, a d ray, an F ray, and a g ray, horizontal-direction and vertical-direction astigmatism and field curvature regarding the d ray, and distortion regarding the d ray. Note that the C ray is light having a wavelength of 656.2725 nm, the d ray is light having a wavelength of 587.5618 nm, the F ray is light having a wavelength of 486.1327 nm, and the g ray is light having a wavelength of 435.8343 nm. FIG. 12B shows lateral aberration to each of the C ray, d ray, F ray, and g ray in the five field angles illustrated in FIG. 11.

It can be seen from FIG. 12A that the spherical aberration as to each spectrum of the C ray, d ray, F ray, and g ray was suppressed to 0.025 mm or lower, astigmatism to 0.007 mm or lower, field curvature to 0.009 mm or lower, and distortion to 9% or lower. It can also be seen from FIG. 12B that lateral aberration was suppressed to 0.01 mm or lower at each field angle. Further, it can be seen that relative illumination was 100%, no vignetting due to the aperture diaphragm 3 occurred, and an optical system that is bright from on-axis to off-axis has been realized.

Thus, according to the optical system 20 of the present Example, high resolution over a wide field angle can be realized with a simple and small configuration. Particularly, aberrations can be favorably corrected even though the focal distance is f=27.0 mm which is long, and the aperture value is F=2.0 which is bright.

Third Example

Figure 13:
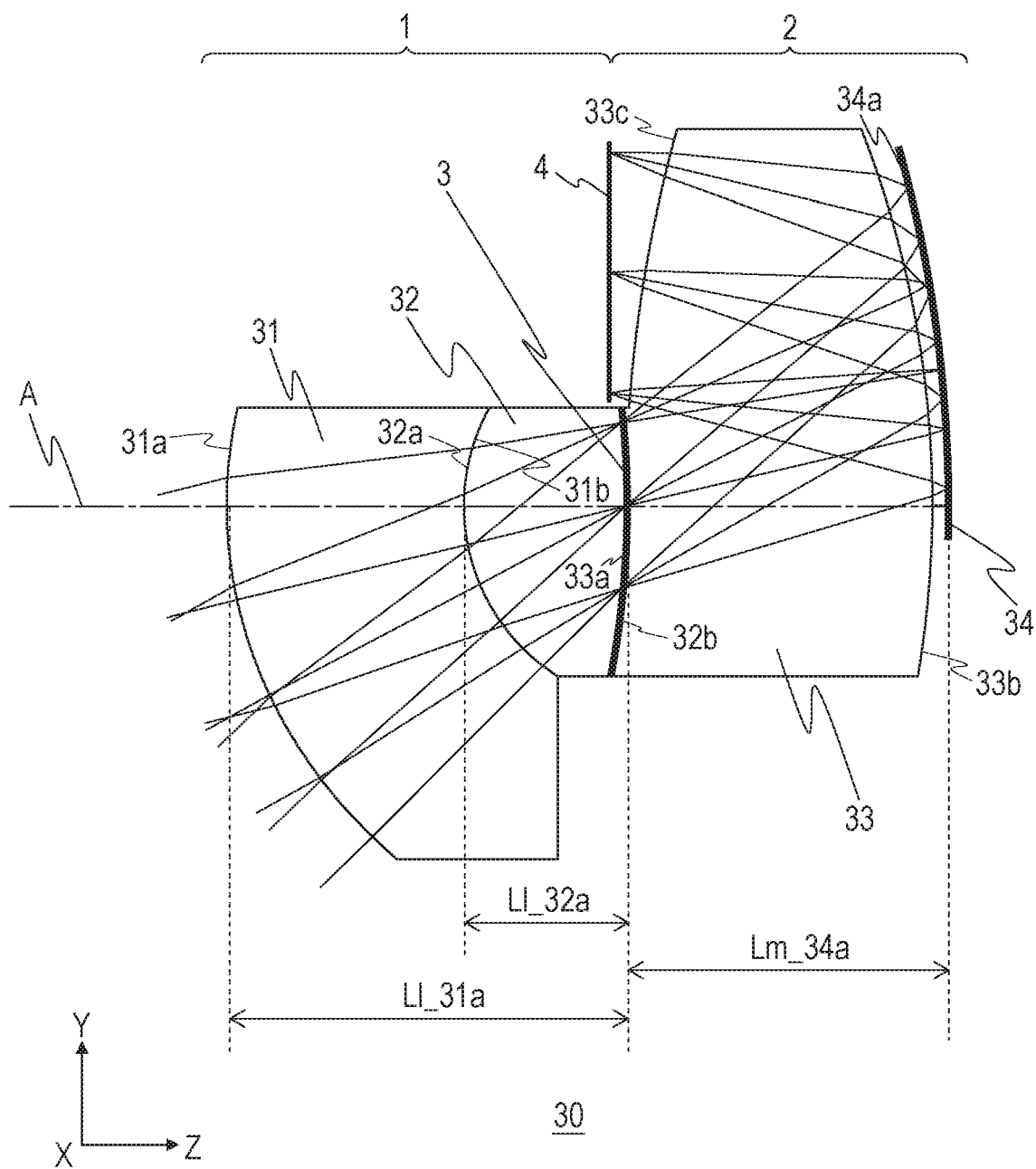
FIG. 13 is a schematic diagram of principal portions of an optical system according to a third example of the present invention.

FIG. 13 is a schematic diagram of principal portions of an optical system 30 according to a third Example of the present invention, in a YZ cross-section including the optical axis A. With regard to the optical system 30 according to the present Example, the focal length of the entire system is f=27.0 mm, the horizontal field angle is θx=45° (θx=−22.5° through +22.5°), the vertical field angle is θy=30° (θy=+14° through +44°), and the aperture value is F=2.0. The optical system 30 according to the present Example uses an optical element (mirror) having a front reflective surface instead of an optical element (catadioptric lens) having an internal reflective surface, unlike the optical system 20 according to the second Example.

In the optical system 30, the front group 1 that is closer to the object side than the aperture diaphragm 3 includes a first optical element 31 and a second optical element 32 in that order from the object side, and the rear group 2 that is closer to the image side than the aperture diaphragm 3 includes a third optical element 33 and a fourth optical element 34 in that order from the object side. The first optical element 31, second optical element 32, and third optical element 33 are lenses, and the fourth optical element 34 is a mirror (surface mirror). The aperture diaphragm 3 is provided at the junction surface of the second optical element 32 and third optical element 33.

Table 5 illustrates specification values of the optical system 30 according to the present Example.

TABLE 5

Table 5: Configuration of Optical System 30 According to Third Example

| Surface No. | Surface Name | Symbol | | Surface type | Curvature radius R | Inter-surface distance d | Refractive index Nd | Abbe number vd | Length to aperture diaphragm L | Curvature center position Dc | Power of surface φ1 |
|---|---|---|---|---|---|---|---|---|---|---|---|
| 1 | First optical element | First surface | 31a Aspheric | Refractive surface | 25.3992 | 13.973 | 1.64769 | 33.8 | 23.5097 | 0.0000 | 0.026 |
| 2 | First optical element | Second surface | 31b Spherical | Refractive surface | 11.7310 | 9.537 | 1.49782 | 67.0 | 9.5370 | 0.3045 | −0.013 |
| | Second optical element | First surface | 32a | | | | | | | | |
| 3 | Second optical element Aperture diaphragm Third optical element | Second surface First surface | 32b Spherical 3 33a | Refractive surface | −52.0012 | 17.960 | 1.55332 | 71.7 | 0.0000 | 53.8907 | −0.001 |
| 4 | Third optical element | Second surface | 33b Spherical | Refractive surface | −59.4388 | 1.000 | | | 17.9603 | 43.3680 | 0.026 |
| 5 | Fourth optical element | Reflective surface | 34a Aspheric | Reflective surface | −76.3425 | −1.000 | | | 18.9603 | | |

TABLE 5-continued

Table 5: Configuration of Optical System 30 According to Third Example

| 6 | Third optical element | Second surface | 33b | Spherical | Refractive surface | −59.4388 | −17.960 | 1.55332 | 71.7 |
| 7 | Third optical element | Third surface | 33c | Spherical | Refractive surface | 81.0118 | −1.000 | Air | |
| 8 | Light receiving surface | | 4 | Planar | | ∞ | | | |

| Coefficient Item | | Value |
|---|---|---|
| Aspheric Surface Coefficients (Surface No. 1) | | |
| Conic constant | K | −6.91289E−01 |
| 4th-order coefficient | A | 3.97193E−06 |
| 6th-order coefficient | B | 5.70221E−09 |
| 8th-order coefficient | C | −1.05669E−11 |
| 10th-order coefficient | D | 3.94547E−14 |
| 12th-order coefficient | E | −4.00744E−17 |
| 14th-order coefficient | F | 0.00000E+00 |
| 16th-order coefficient | G | 0.00000E+00 |
| Aspheric Surface Coefficients (Surface No. 5) | | |
| Conic constant | K | −9.49416E−01 |
| 4th-order coefficient | A | −3.27734E−07 |
| 6th-order coefficient | B | −8.65184E−10 |
| 8th-order coefficient | C | −8.49632E−13 |
| 10th-order coefficient | D | 5.73724E−15 |
| 12th-order coefficient | E | −1.36542E−17 |
| 14th-order coefficient | F | 3.27131E−20 |
| 16th-order coefficient | G | −3.69174E−23 |

| | Start surface | End surface | Focal Length (mm) | Power | Power ratio (entire system) |
|---|---|---|---|---|---|
| Entire system | Surface No. 1 | Surface No. 7 | 27.0 | 0.037 | 1.00 |
| Frontmost surface through short of reflective surface | Surface No. 1 | Surface No. 4 | 51.1 | 0.020 | 0.53 |
| Reflective surface | Surface No. 5 | Surface No. 5 | 38.2 | 0.026 | 0.71 |

| | Inter-surface distance (mm) |
|---|---|
| Frontmost surface through aperture diaphragm | 23.51 |
| Frontmost surface through entrance pupil | 22.67 |
| Aperture diaphragm through entrance pupil Lp | 0.84 |

The light flux from the unshown subject passes through the first optical element 31 and second optical element 32, and thereafter is restricted by the shielding portion of the aperture diaphragm 3. The light flux that has passed through the aperture portion of the aperture diaphragm 3 passes through the first surface 33a and second surface 33b of the third optical element 33, in that order, and is reflected at the reflective surface 34a of the fourth optical element 34. The reflected light flux is transmitted through the second surface 33b of the third optical element 33 again, emitted from the third surface 33c, and forms the image plane 4 that is planar in shape.

In the optical system 30 according to the present Example, three optical surfaces that the front group 1 has, which are the first surface 31a of the first optical element 31, the second surface 31b of the first optical element 31, and the first surface 32a of the second optical element 32, are point-symmetrically shaped refractive surfaces that satisfy Conditional Expression (1).

Specifically, with regard to the refractive surface 31a, the curvature radius of the base spherical surface is Rl=25.3992 mm and the distance as to the aperture diaphragm 3 on the optical axis A is Ll=23.5097 mm, so |Rl|/Ll=1.08, and thus Conditional Expressions (1) and (1') are satisfied. Also, with regard to the refractive surfaces 31b and 32a, the curvature radius of the base spherical surface is Rl=11.7310 mm and the distance as to the aperture diaphragm 3 on the optical axis A is Ll=9.5370 mm, so |Rl|/Ll=1.23, and thus Conditional Expressions (1) and (1') are satisfied.

The distance on the optical axis A between the aperture diaphragm 3 and the entrance pupil is Lp=0.840 mm, and Lp/f=0.03, so Conditional Expression (5) is satisfied. The distance between the curvature center of the refractive surface 31a and the curvature centers of the refractive surfaces 31b and 32a is Dc=0.3045 mm, so Dc/f=0.01, and thus Conditional Expression (6) is satisfied. Further, the power of the refractive surfaces 31b and 32a is ϕl=−0.013 and the power of the entire system is ϕ=0.037, so the refractive surfaces 31b and 32a satisfying Conditional Expression (1) satisfy Conditional Expression (7), since ϕl/ϕ=0.345.

The reflective surface 34a of the fourth optical element 34 according to the present Example is a concave aspheric surface. The reflective surface 34a according to the present Example also is aspheric, being defined by the aspheric surface expression above in the same way as the reflective surface 24b in the Second Example, and has a shape where the fringe portion is largely deformed toward the side opposite to the image plane 4 as compared to the optical axis A, from the concave base spherical surface.

Specifically, the curvature radius of the base spherical surface of the reflective surface 34a is Rm=−76.3425 mm, the distance as to the aperture diaphragm 3 on the optical axis A is Lm=18.9603 mm, so Conditional Expressions (2) and (2') are satisfied since |Rm|/Lm=4.03. Also in the present Example, the focal length from the optical surface closest to the object side (refractive surface 31a) to the optical surface immediately short of the reflective surface 34a (refractive surface 33b) is ff=51.1 mm, so |Rm|/ff=1.49 holds, and thus Conditional Expression (3) is satisfied. Further, f/|Rm|=0.35 holds, so Conditional Expression (4) is satisfied.

Table 6 shows the values of Conditional Expressions (1) through (7) in the optical system 30 according to the present Example.

TABLE 6

Table 6: Conditional Expressions (Third Example)

| | | |
|---|---|---|
| Conditional Expressions (1), (1') |R|/Ll | 1.080 (Surface No. 1) | 1.230 (Surface No. 2) |
| Conditional Expressions (2), (2') |Rm|/Lm | 4.026 (Surface No. 5) | |
| Conditional Expressions (3) |Rm|/ff | 1.49 (Surface No. 5) | |
| Conditional Expressions (4) f/|Rm| | 0.35 (Surface No. 5) | |
| Conditional Expressions (5) Lp/f | 0.03 | |
| Conditional Expressions (6) Dc/f | 0.011 (Surface No. 2) | |
| Conditional Expressions (7) φl/φ | −0.345 (Surface No. 2) | |

FIGS. 14A and 14B are aberration diagrams regarding the optical system 30, where FIGS. 14A and 14B respectively show longitudinal aberration and lateral aberration of the optical system 30, in the same way as in FIGS. 12A and 12B. It can be seen from FIG. 14A that the spherical aberration as to each spectrum of the C ray, d ray, F ray, and g ray was suppressed to 0.03 mm or lower, astigmatism to 0.02 mm or lower, and field curvature to 0.04 mm or lower. It can also be seen from FIG. 14B that lateral aberration was suppressed to 0.01 mm or lower at each field angle.

Fourth Example

Figure 15:
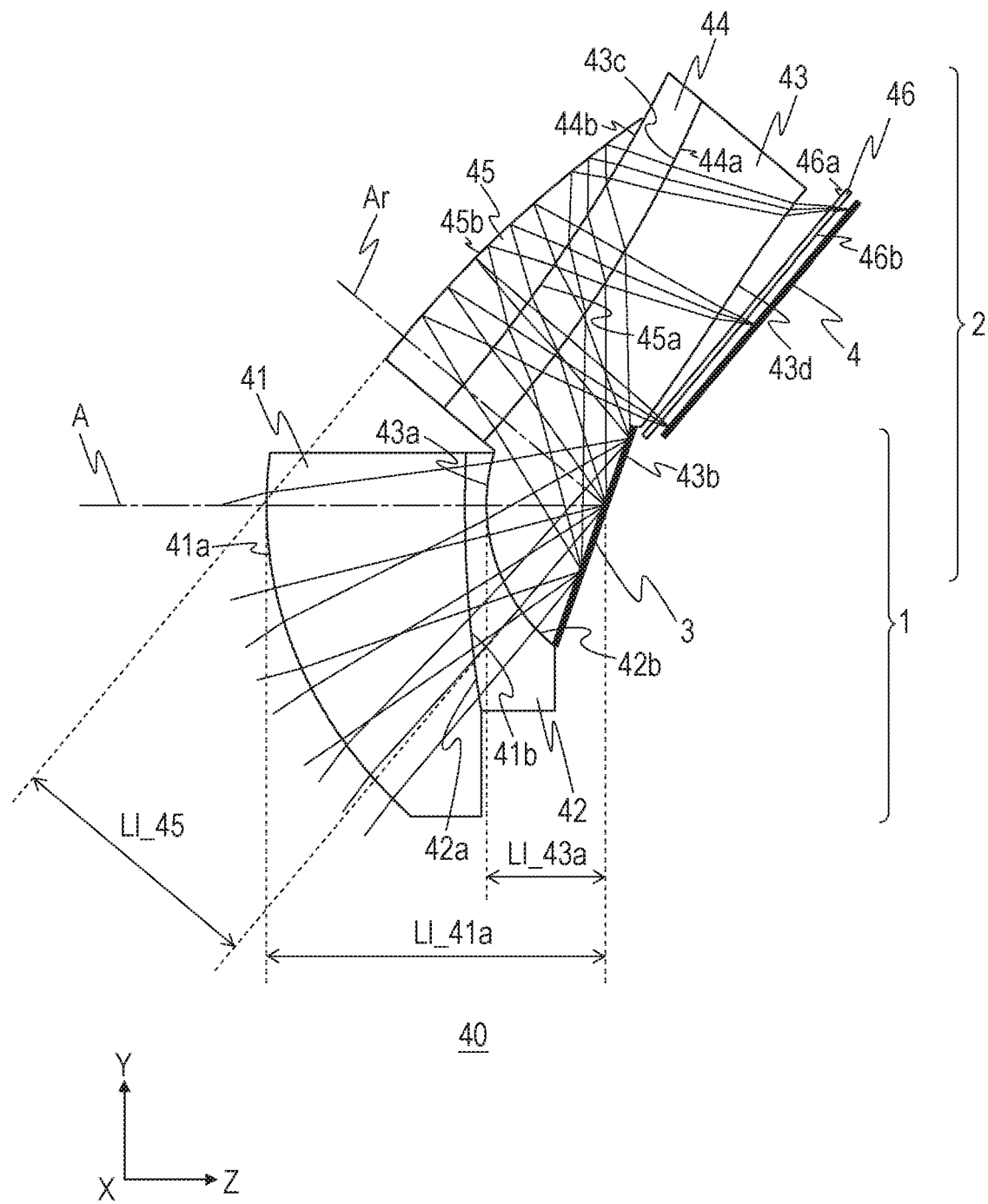
FIG. 15 is a schematic diagram of principal portions of an optical system according to a fourth example of the present invention.

FIG. 15 is a schematic diagram of principal portions of an optical system 40 according to a fourth Example of the present invention, in a YZ cross-section including the optical axis A. With regard to the optical system 40 according to the present Example, the focal length of the entire system is f=28.5 mm, the horizontal field angle is θx=50° (θx=−25° through +25°), the vertical field angle is θy=38° (θy=+15° through +53°), and the aperture value is F=2.0. Unlike the optical system 20 according to the second Example, the optical system 40 according to the present Example has the aperture diaphragm 3 provided to a reflective surface, so that an optical axis Ar of the rear group 2 is inclined as to the optical axis A of the front group 1.

In the optical system 40, the front group 1 that is closer to the object side than the aperture diaphragm 3 includes a first optical element 41, a second optical element 42, and a third optical element 43, in that order from the object side. The rear group 2 that is closer to the image side than the aperture diaphragm 3 includes the third optical element 43, a fourth optical element 44, a fifth optical element 45, and a sixth optical element 46, in that order from the object side. That is to say, the front group 1 and rear group 2 share part of the third optical element 43 in the present Example.

The first optical element 41 is a meniscus lens with the convex surface facing the object side, having an aspheric first surface 41a and a spherical second surface 41b. The second optical element 42 is a meniscus lens with the convex surface facing the object side, having a first surface 42a and a second surface 42b that are both spherical. The third optical element 43 is a lens having four optical surfaces, which are a first surface 43a that is convex toward the object side, a planar second surface 43b, a spherical third surface 43c that is convex toward the image side, and an aspheric third surface 43d.

The surface apices of the first surface 43a and second surface 43b of the third optical element 43 are situated on the optical axis A of the front group 1, while the surface apices of the third surface 43c and fourth surface 43d are situated on the optical axis Ar of the rear group 2. The aperture diaphragm 3 is provided on the second surface 43b of the third optical element 43, and the aperture portion of the aperture diaphragm 3 is a reflective surface while the shielding portion of the aperture diaphragm 3 is a non-reflective surface (low-reflective surface).

The fourth optical element 44 is a meniscus lens with the convex surface facing the image side, having a first surface 44a and a second surface 44b that are both spherical. The fifth optical element 45 is a catadioptric lens having a first surface 45a that is a refractive surface and a second surface 45b that is a reflective surface, with the first surface 45a being a spherical surface that is convex toward the image side, and the second surface 45b being a concave aspheric surface. The sixth optical element 46 is a cover glass having a first surface 46a and a second surface 46b, neither of which have power.

Table 7 illustrates specification values of the optical system 40 according to the present Example.

TABLE 7

Table 7: Configuration of Optical System 40 According to Fourth Example

| Surface No. | Surface Name | Symbol | | Surface type | | Curvature radius R (mm) | Horizontal coordinate X (mm) | Vertical coordinate Y (mm) | Optical axis coordinate Z (mm) | Horizontal axis rotation α (deg) | Vertical axis rotation β (deg) | Optical axis rotation γ (deg) | Refractive index Nd | Abbe number vd | Length to aperture diaphragm L | Curvature center position Dc | Power of surface φl |
|---|---|---|---|---|---|---|---|---|---|---|---|---|---|---|---|---|---|
| 1 | First optical element First surface | 41a | Aspheric | Refractive surface | | 33.7031 | 0.000 | 0.000 | 0.000 | 0.000 | 0.000 | 0.000 | 1.78470 | 26.3 | 29.587 | 0.0000 | 0.023 |
| 2 | First optical element Second surface | 41b | Spherical | Refractive surface | | 105.0791 | 0.000 | 0.000 | 17.254 | 0.000 | 0.000 | 0.000 | 1.75520 | 27.6 | 12.334 | 88.6296 | 0.000 |
| 3 | Second optical element First surface Second optical element Second surface | 42a 42b | Spherical | Refractive surface | | 15.3768 | 0.000 | 0.000 | 19.154 | 0.000 | 0.000 | 0.000 | 1.60625 | 63.7 | 10.434 | 0.827 | -0.010 |
| 4 | Third optical element First surface Third optical element Second surface | 43a 43b | Planar | Reflective surface | | ∞ | 0.000 | 0.000 | 29.587 | -20.000 | 0.000 | 0.000 | 1.60625 | 63.7 | 0.000 | | |
|  | Aperture diaphragm | 3 | | | | | | | | | | | | | | | |
| 5 | Third optical element Fourth optical element First surface | 43c 44a | Spherical | Refractive surface | | -123.0968 | 0.000 | 7.427 | 20.736 | -40.000 | 0.000 | 0.000 | 2.00270 | 19.3 | 11.555 | 115.658 | -0.003 |
| 6 | Fourth optical element Second surface Fifth optical element First surface | 44b 45a | Spherical | Refractive surface | | -142.3386 | 0.000 | 10.411 | 17.180 | -40.000 | 0.000 | 0.000 | 1.58998 | 68.3 | 16.196 | 130.258 | 0.003 |
| 7 | Fifth optical element Second surface | 45b | Aspheric | Refractive surface | | 96.5397 | 0.000 | 14.667 | 12.108 | -40.000 | 0.000 | 0.000 | 1.58998 | 68.3 | 22.818 | | |
| 8 | Fifth optical element First surface Fourth optical element Second surface | 45a 44b | Spherical | Reflective surface | | -142.3386 | 0.000 | 10.411 | 17.180 | -40.000 | 0.000 | 0.000 | 2.00270 | 19.3 | 16.196 | | |
| 9 | Fourth optical element First surface Third optical element Third surface | 44a 43c | Spherical | Refractive surface | | -123.0968 | 0.000 | 7.427 | 20.736 | -40.000 | 0.000 | 0.000 | 1.60625 | 63.7 | 11.555 | | |
| 10 | Third optical element Fourth surface | 43d | Aspheric | Refractive surface | | -5.4348 | 0.000 | 0.999 | 28.396 | -40.000 | 0.000 | 0.000 | Air | | 1.555 | | |
| 11 | Sixth optical element First surface | 46a | Planar | Refractive surface | | ∞ | 0.000 | 0.935 | 28.473 | -40.000 | 0.000 | 0.000 | 1.51633 | 64.1 | | | |
| 12 | Sixth optical element Second surface | 46b | Planar | Refractive surface | | ∞ | 0.000 | 0.614 | 28.856 | -40.000 | 0.000 | 0.000 | Air | | | | |
| 13 | Light receiving surface | 4 | Planar | | | | 0.000 | -0.029 | 29.622 | -40.000 | 0.000 | 0.000 | | | | | |

Aspheric Surface Coefficients (Surface No. 1)

| Coefficient Item | | Value |
|---|---|---|
| Conic constant | K | -9.08667E-01 |
| 4th-order coefficient | A | 2.49692E-06 |
| 6th-order coefficient | B | 8.75449E-10 |
| 8th-order coefficient | C | -2.17506E-13 |
| 10th-order coefficient | D | 1.54947E-15 |
| 12th-order coefficient | E | -1.68124E-18 |
| 14th-order coefficient | F | 0.00000E+00 |
| 16th-order coefficient | G | 0.00000E+00 |

TABLE 7-continued

Table 7: Configuration of Optical System 40 According to Fourth Example

Aspheric Surface Coefficients (Surface No. 7)

| | |
|---|---|
| Conic constant | K | 5.35395E+00 |
| 4th-order coefficient | A | −1.43147E−06 |
| 6th-order coefficient | B | 2.54674E−10 |
| 8th-order coefficient | C | −7.58435E−13 |
| 10th-order coefficient | D | 2.75547E−16 |
| 12th-order coefficient | E | −1.18799E−19 |
| 14th-order coefficient | F | 0.00000E+00 |
| 16th-order coefficient | G | 0.00000E+00 |

Aspheric Surface Coefficients (Surface No. 10)

| | | |
|---|---|---|
| Conic constant | K | −2.77506E+02 |
| 4th-order coefficient | A | −6.95701E−06 |
| 6th-order coefficient | B | 1.32196E−08 |
| 8th-order coefficient | C | −9.53814E−12 |
| 10th-order coefficient | D | 2.48397E−15 |
| 12th-order coefficient | E | 0.00000E+00 |
| 14th-order coefficient | F | 0.00000E+00 |
| 16th-order coefficient | G | 0.00000E+00 |

| | Start surface | End surface | Focal Length (mm) | Power | Power ratio (entire system) |
|---|---|---|---|---|---|
| Entire system | Surface No. 1 | Surface No. 10 | 28.5 | 0.035 | 1.00 |
| Frontmost surface through short of reflective surface | Surface No. 1 | Surface No. 6 | 62.2 | 0.016 | 0.46 |
| Reflective surface | Surface No. 7 | Surface No. 7 | 48.3 | 0.021 | 0.59 |

| | Inter-surface distance (mm) |
|---|---|
| Frontmost surface through aperture diaphragm | 29.59 |
| Frontmost surface through entrance pupil | 27.72 |
| Aperture diaphragm through entrance pupil Lp | 1.87 |

The light flux from the unshown subject passes through the first optical element 41 and second optical element 42, is transmitted through the first surface 43a of the third optical element 43, and enters the aperture diaphragm 3 provided to the second surface 43b of the third optical element 43. The light flux reflected at the aperture operation of the aperture diaphragm 3 is successively transmitted through the third surface 43c of the third optical element 43, the first surface 44a of the fourth optical element 44, the second surface 44b of the fourth optical element 44, and the first surface 45a of the fifth optical element 45, in that order, and thereafter is reflected at the second surface 45b of the fifth optical element 45. The reflected light flux is transmitted again through the first surface 45a of the fifth optical element 45, the second surface 44b of the fourth optical element 44, and the first surface 44a of the fourth optical element 44, in that order, is emitted from the fourth surface 43d of the third optical element 43, and forms the image plane 4 that is planar via the sixth optical element 46.

Thus, according to the optical system 40, the aperture portion of the aperture diaphragm 3 is a reflective surface, and the rear group 2 is decentered (tilted or shifted) as to the optical axis A of the front group 1, whereby the position of the image plane 4 can also be decentered. This enables the imaging device or display device to be decentered as to the optical axis A when applying the optical system 40 to an imaging apparatus or a projecting apparatus, and thus the degree of freedom in design can be raised while avoiding interference with the light paths.

In the optical system 40 according to the present Example, three optical surfaces that the front group 1 has, which are the first surface 41a of the first optical element 41, the second surface 42b of the second optical element 42, and the first surface 43a of the third optical element 43, are point-symmetrically shaped refractive surfaces that satisfy Conditional Expression (1).

Specifically, with regard to the refractive surface 41a, the curvature radius of the base spherical surface is Rl=33.703 mm and the distance as to the aperture diaphragm 3 on the optical axis A is Ll=29.587 mm, so |Rl|/Ll=1.14, and thus Conditional Expressions (1) and (1') are satisfied. Also, with regard to the refractive surfaces 42b and 43a, the curvature radius of the base spherical surface is Rl=15.3768 mm and the distance as to the aperture diaphragm 3 on the optical axis A is Ll=10.434 mm, so |Rl|/Ll=1.47, and thus Conditional Expression (1) is satisfied.

In the present Example, distance between the aperture diaphragm 3 and the entrance pupil on the optical axis A is Lp=1.868 mm, and Lp/f=0.07, so Conditional Expression (5) is satisfied. The distance between the curvature center of the refractive surface 41a and the curvature centers of the refractive surfaces 42b and 43a is Dc=0.827 mm, so Dc/f=0.03, and thus Conditional Expression (6) is satisfied. Further, the power of the refractive surfaces 42b and 43a is $\phi$l=−0.010 and the power of the entire system is $\phi$=0.035, so the refractive surfaces 42b and 43a satisfying Conditional Expression (1) satisfy Conditional Expression (7), since $\phi$l/$\phi$=−0.276.

The second surface 45b of the fifth optical element 45 according to the present Example is a concave reflective surface as described above, and also is aspheric, being defined by the aspheric surface expression above. The curvature radius of the base spherical surface of the reflective surface 45b is Rm=96.540 mm, the distance as to the aperture diaphragm 3 on the optical axis Ar is Lm=22.818 mm, so Conditional Expressions (2) and (2') are satisfied since |Rm|/Lm=4.23. Also in the present Example, the focal length or the optical part from the refractive surface 41a closest to the object side to the refractive surface 44b immediately short of the reflective surface 45b having the greatest power in the rear group 2 is ff=62.2 mm, so |Rm|/ff=1.50 holds, and thus Conditional Expression (3) is satisfied. Further, f/|Rm|=0.30 holds, so Conditional Expression (4) is satisfied.

Table 8 shows the values of Conditional Expressions (1) through (7) in the optical system 40 according to the present Example.

TABLE 8

Table 8: Conditional Expressions (Fourth Example)

| Conditional Expressions (1) |Rl|/Ll | 1139 (Surface No. 1) | 1.474 (Surface No. 3) |
|---|---|---|
| Conditional Expressions (1') |Rl|/Ll | 1139 (Surface No. 1) | |
| Conditional Expressions (2), (2') |Rm|/Lm | 4.231 (Surface No. 7) | |
| Conditional Expressions (3) |Rm|/ff | 1.50 (Surface No. 7) | |
| Conditional Expressions (4) f/|Rm| | 0.30 (Surface No. 7) | |
| Conditional Expressions (5) Lp/f | 0.07 | |
| Conditional Expressions (6) Dc/f | 0.029 (Surface No. 3) | |
| Conditional Expressions (7) $\phi$l/$\phi$ | −0.276 (Surface No. 3) | |

FIGS. 16A and 16B are aberration diagrams regarding the optical system 40, where FIGS. 16A and 16B respectively show longitudinal aberration and lateral aberration of the optical system 40. It can be seen from FIG. 16A that the spherical aberration, astigmatism, and field curvature were favorably corrected regarding each spectrum of the C ray, d ray, F ray, and g ray. It can also be seen from FIG. 16B that lateral aberration was favorably corrected at each field angle.

Fifth Example

Figure 17:
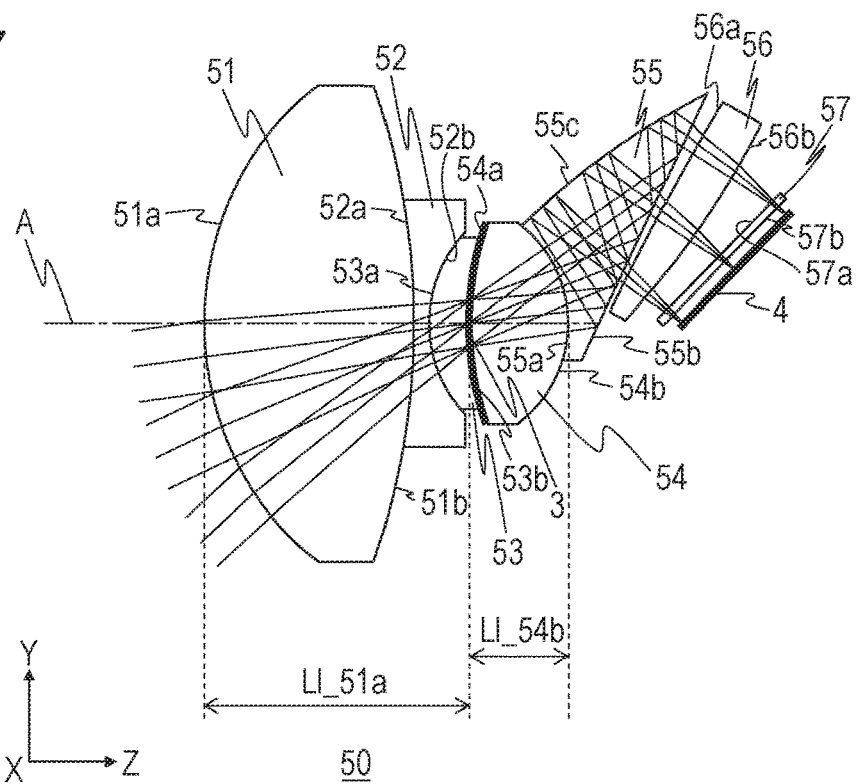
FIG. 17 is a schematic diagram of principal portions of an optical system according to a fifth example of the present invention.

FIG. 17 is a schematic diagram of principal portions of an optical system 50 according to a fifth Example of the present invention, in a YZ cross-section including the optical axis A. With regard to the optical system 50 according to the present Example, in the horizontal cross-section, the focal length of the entire system is f=15.7 mm, the field angle is θx=50° (θx=−25° through +25°), the and the aperture value is F=1.2. in a vertical cross-section, the focal length of the entire system is f=16.0 mm, the field angle is θy=34.5° (θy=+8° through +42.5°), and the aperture value is F=3.4. Unlike the optical systems if the other Examples, the optical system 50 according to the present Example has a total reflection surface and a decentered surface disposed on the image side from the aperture diaphragm 3.

In the optical system 50, the front group 1 that is closer to the object side than the aperture diaphragm 3 includes a first optical element 51, a second optical element 52, and a third optical element 53, in that order from the object side. The rear group 2 that is closer to the image side than the aperture diaphragm 3 includes a fourth optical element 54, a fifth optical element 55, a sixth optical element 56, and a seventh optical element 57, in that order from the object side.

The first optical element 51 is a double-convex lens, having an aspheric first surface 51a and a spherical second surface 51b. The second optical element 52 is a double-concave lens, having a first surface 52a and second surface 52*b* that are both spherical. The third optical element 53 is a meniscus lens with the convex surface facing the object side, having a first surface 53*a* and a second surface 53*b* that are both spherical.

The fourth optical element 54 is a double-convex lens, having a first surface 54*a* and a second surface 54*b* that are both spherical. The aperture diaphragm 3 is provided on the first surface 54*a* of the fourth optical element 54. The fifth optical element 55 is a lens having three optical surfaces, which are a spherical first surface 55*a*, a planar second surface 55*b*, and a third surface 55*c* that is an aspheric reflective surface. The sixth optical element 56 is a double-convex lens, having a first surface 56*a* and a second surface 56*b* that are both spherical. The seventh optical element 57 is a cover glass having a first surface 57*a* and a second surface 57*b*, neither of which have power.

Note that in the optical system 50, the optical surfaces from the first surface 51*a* of the first optical element 51 through the second surface 55*b* of the fifth optical element 55, in that order from the object side, are disposed on the optical axis A, and the other surfaces are disposed at positions not intersecting with the optical axis A. The optical surfaces of the second surface 55*b* of the fifth optical element 55 through the second surface 57*b* of the seventh optical element 57 are all decentered surfaces, of which the centers (surface apices) are shifted away from the optical axis A. For example, the second surface 55*b* and third surface 55*c* each are tilted decentered surfaces having an inclination of −25.36° on the X axis, and further the third surface 55*c* is decentered by shifting within the vertical cross-section.

Thus, according to the optical system 50, employing optical elements decentered as to the optical axis A also enables the position of the image plane 4 to be decentered, in the same way as in the fourth Example, so the degree of freedom in design can be raised while avoiding interference of the imaging device or display device with the light paths.

Table 9 illustrates specification values of the optical system 50 according to the present Example.

TABLE 9

Table 9: Configuration of Optical System 50 According to Fifth Example

| Surface No. | Surface Name | Symbol | | Surface type | Curvature radius R (mm) | Horizontal coordinate X (mm) | Vertical coordinate Y (mm) | Optical axis coordinate Z (mm) | Horizontal axis rotation α (deg) | Vertical axis rotation β (deg) | Optical axis rotation γ (deg) | Refractive index Nd | Abbe number vd | Length to aperture diaphragm L | Curvature center position Dc | Power of surface φl |
|---|---|---|---|---|---|---|---|---|---|---|---|---|---|---|---|---|
| 1 | First optical element First surface | 51a | Aspheric | Refractive surface | 20.2981 | 0.000 | 0.000 | 0.000 | 0.000 | 0.000 | 0.000 | 1.80810 | 22.8 | 17.300 | 0.0000 | 0.073 |
| 2 | First optical element Second surface | 51b | Spherical | Refractive surface | −46.8030 | 0.000 | 0.000 | 13.700 | 0.000 | 0.000 | 0.000 | 1.92119 | 23.96 | 3.600 | 53.4010 | −0.002 |
| | Second optical element First surface | 52a | | | | | | | | | | | | | | |
| 3 | Second optical element Second surface | 52b | Spherical | Refractive surface | 8.5436 | 0.000 | 0.000 | 14.700 | 0.000 | 0.000 | 0.000 | 1.74950 | 35.28 | 2.600 | 2.946 | |
| | Third optical element First surface | 53a | | | | | | | | | | | | | | |
| 4 | Third optical element Second surface | 53b | Spherical | Refractive surface | 19.6271 | 0.000 | 0.000 | 17.300 | 0.000 | 0.000 | 0.000 | 1.83481 | 42.73 | 0.000 | | −0.020 |
| | Aperture diaphragm | 3 | | | | | | | | | | | | | | |
| | Fourth optical element First surface | 54a | | | | | | | | | | | | | | |
| 5 | Fourth optical element Second surface | 54b | Spherical | Refractive surface | −8.0867 | 0.000 | 0.000 | 23.800 | 0.000 | 0.000 | 0.000 | 2.00100 | 13.40 | 6.500 | 4.585 | −0.021 |
| | Fifth optical element First surface | 55a | | | | | | | | | | | | | | |
| 6 | Fifth optical element Second surface | 55b | Planar | Reflective surface | ∞ | 0.000 | −5.606 | 25.800 | −25.360 | 0.000 | 0.000 | 2.00100 | 13.40 | 8.500 | | |
| 7 | Fifth optical element Third surface | 55c | Aspheric | Reflective surface | 43.4215 | 0.000 | 0.000 | 12.298 | −25.360 | 0.000 | 0.000 | 2.00100 | 13.40 | 18.300 | | |
| 8 | Fifth optical element Second surface | 55b | Planar | Refractive surface | ∞ | 0.000 | 11.851 | 25.800 | −25.360 | 0.000 | 0.000 | Air | | 8.500 | | |
| 9 | Sixth optical element First surface | 56a | Spherical | Refractive surface | 192.7345 | 0.000 | 10.347 | 32.413 | −30.080 | 0.000 | 0.000 | 1.84666 | 23.78 | 19.205 | | |
| 10 | Sixth optical element Second surface | 56b | Spherical | Refractive surface | −57.7762 | 0.000 | 8.682 | 35.009 | −44.250 | 0.000 | 0.000 | Air | | 20.510 | | |
| 11 | Seventh optical element First surface | 57a | Planar | Refractive surface | ∞ | 0.000 | 7.701 | 37.884 | −44.250 | 0.000 | 0.000 | 1.51633 | 64.1 | | | |
| 12 | Seventh optical element First surface | 57b | Planar | Refractive surface | ∞ | 0.000 | 8.333 | 38.242 | −44.250 | 0.000 | 0.000 | Air | | | | |
| 13 | Light receiving surface | 4 | Planar | | ∞ | 0.000 | 7.701 | 38.891 | −44.250 | 0.000 | 0.000 | | | | | |

Aspheric Surface Coefficients (Surface No. 1)

| Coefficient Item | | Value |
|---|---|---|
| Conic constant | K | 0.00000E+00 |
| 4th-order coefficient | A | 1.16811E−06 |
| 6th-order coefficient | B | 6.95497E−10 |
| 8th-order coefficient | C | 8.94365E−11 |
| 10th-order coefficient | D | −5.03269E−13 |
| 12th-order coefficient | E | 1.95227E−15 |
| 14th-order coefficient | F | 0.00000E+00 |
| 16th-order coefficient | G | 0.00000E+00 |

TABLE 9-continued

Table 9: Configuration of Optical System 50 According to Fifth Example

Aspheric Surface Coefficients (Surface No. 7)

| | |
|---|---|
| Conic constant K | 0.00000E+00 |
| 4th-order coefficient A | 4.01749E−06 |
| 6th-order coefficient B | −1.40324E−08 |
| 8th-order coefficient C | 2.31039E−11 |
| 10th-order coefficient D | −2.04063E−14 |
| 12th-order coefficient E | 7.22469E−18 |
| 14th-order coefficient F | 0.00000E+00 |
| 16th-order coefficient G | 0.00000E+00 |

| | Start surface | End surface | Focal Length (mm) | Power | Power ratio (entire system) |
|---|---|---|---|---|---|
| Entire system | Surface No. 1 | Surface No. 10 | 15.7 | 0.064 | 1.00 |
| Frontmost surface through short of reflective surface | Surface No. 1 | Surface No. 6 | 62.4 | 0.016 | 0.25 |
| Reflective surface | Surface No. 7 | Surface No. 7 | 21.7 | 0.046 | 0.72 |

| | Inter-surface distance (mm) |
|---|---|
| Frontmost surface through aperture diaphragm | 17.30 |
| Frontmost surface through entrance pupil | 15.37 |
| Aperture diaphragm through entrance pupil Lp | 1.93 |
| Object-side point symmetry lens surface through aperture diaphragm D1 | 3.00 |
| Image-side point symmetry lens surface through aperture diaphragm D2 | −1.59 |

The light flux from the unshown subject passes through the first optical element 51, second optical element 52, and third optical element 53, in that order, and is restricted by the aperture diaphragm 3 provided to the first surface 54a of the fourth optical element 54. The light flux that has passed through the aperture of the aperture diaphragm 3 is transmitted through the second surface 54b of the fourth optical element 54 and the first surface 55a of the fifth optical element 55 in that order, and hereafter is subjected to total reflection at the second surface 55b of the fifth optical element 55 and greatly changes the direction of travel, and is input to the third surface 55c of the fifth optical element 55. The light flux that has been reflected at the third surface 55c of the fifth optical element 55 is transmitted through the second surface 55b of the fifth optical element 55, the first surface 56a of the sixth optical element 56, and the second surface 56b of the sixth optical element 56, in that order, and forms the image plane 4 that is planar via the seventh optical element 57.

In the optical system 50 according to the present Example, three optical surfaces that the front group 1 has, which are the first surface 51a of the first optical element 51, the second surface 54b of the fourth optical element 54, and the first surface 55a of the fifth optical element 55, are point-symmetrically shaped refractive surfaces that satisfy Conditional Expression (1).

Specifically, with regard to the refractive surface 51a, the curvature radius of the base spherical surface is Rl=20.298 mm and the distance as to the aperture diaphragm 3 on the optical axis A is Ll=17.300 mm, so |Rl|/Ll=1.17, and thus Conditional Expressions (1) and (1') are satisfied. Also, with regard to the refractive surfaces 54b and 55a, the curvature radius of the base spherical surface is Rl=−8.087 mm and the distance as to the aperture diaphragm 3 on the optical axis A is Ll=6.500 mm, so |Rl|/Ll=1.24, and thus Conditional Expressions (1) and (1') are satisfied.

Also, the distance between the aperture diaphragm 3 and the entrance pupil on the optical axis A is Lp=1.93 mm, and normalizing by focal length f=15.7 mm yields Lp/f=0.12, so Conditional Expression (5) is satisfied. Further, the power of the refractive surfaces 54b and 55a is ϕl=−0.021 and the power of the entire system is ϕ=0.064, so the refractive surfaces 54b and 55a satisfying Conditional Expression (1) satisfy Conditional Expression (7), since ϕl/ϕ=−0.323.

Employing a configuration where both the front group 1 and the rear group 2 have refractive surfaces that satisfy Conditional Expression (1) as in the present Example enables both spherical aberration and axial chromatic aberration to be favorably corrected. In doing so, the configuration preferably is such that the centers of curvature of the refractive surfaces are situated near the aperture diaphragm 3. Further, the configuration preferably is such that the center of curvature of the refractive surface in the front group 1 and the center of curvature of the refractive surface in the rear group 2 are on opposite sides of the aperture diaphragm 3 from each other. Specifically, the refractive surface that is convex toward the object side is preferably situated in the front group 1, and the refractive surface that is concave toward the object side in the rear group 2.

The following Conditional Expression (8) is preferably satisfied where the distance between the center of curvature of the refractive surface included in the front group 1 and the aperture diaphragm 3 is D1 (mm) and the distance between the center of curvature of the refractive surface included in the rear group 2 and the aperture diaphragm 3 is D2 (mm). The "distance" as used here indicates "distance along an optical path", and is positive along the optical path toward the image side, and negative toward the object side.

$$-0.2 \leq (D1+D2)/f \leq 0.2 \quad (8)$$

Satisfying Conditional Expression (8) enables astigmatism to be favorably corrected while suppressing occurrence of comatic aberration, since the centers of curvature of the refractive surfaces that the front group 1 and rear group 2 each have are situated at positions close to and equidistantly from the aperture diaphragm 3. In the present Example, the distance from the center of curvature of the refractive surface 51a of the front group 1 to the aperture diaphragm 3 is D1=3.00 mm, and the distance from the center of curvature of the refractive surface 54b of the rear group 2 to the aperture diaphragm 3 is D2=−1.59 mm, so Conditional Expression (8) is satisfied since (D1+D2)/f=0.09 holds.

Figure 18:
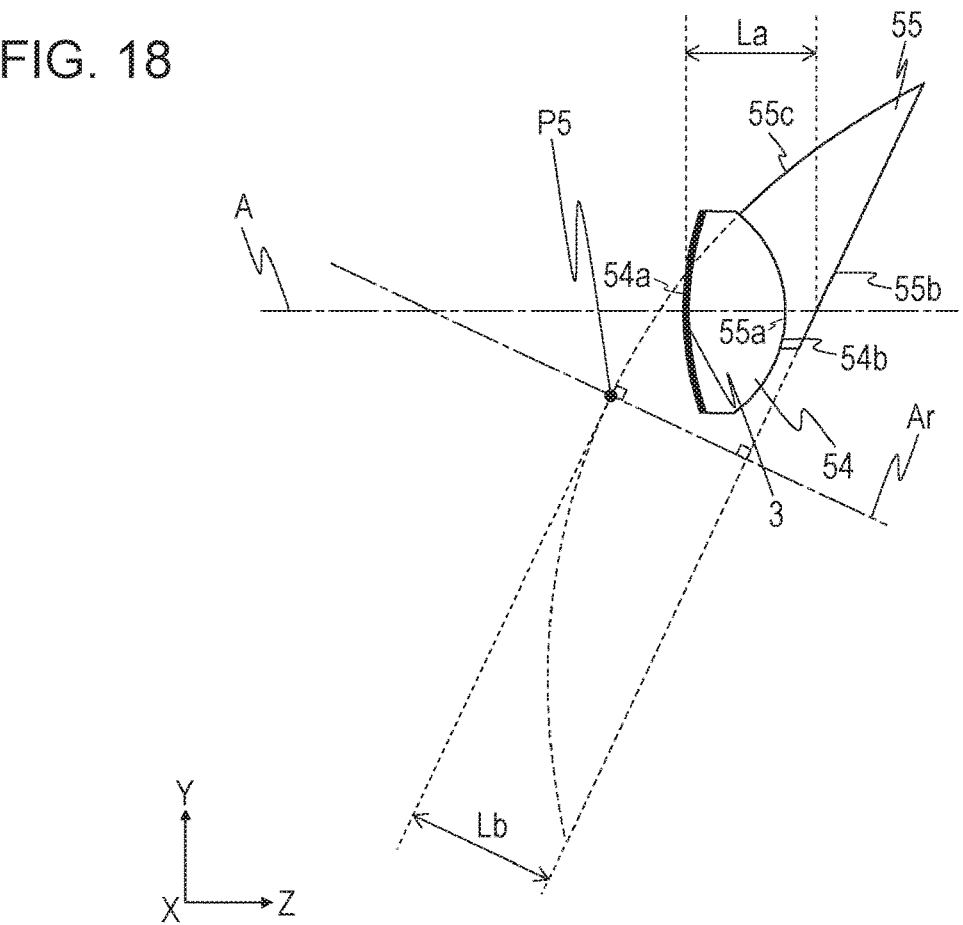
FIG. 18 is a diagram illustrating the configuration of a reflective surface according to the fifth example.

FIG. 18 is an illustration of just the fourth optical element 54 and fifth optical element 55 extracted out of the optical system 50 according to the present Example. The fifth optical element 55 has, of a plano-convex lens including a spherical surface that is convex toward the object side and a planar surface, portions overlapping other optical elements and unnecessary portions where effective light fluxes do not pass (dashed lines) cut away, as illustrated in FIG. 18.

The surface apices of the first surface 54a of the fourth optical element 54 and the first surface 55a and second surface 55b of the fifth optical element 55 are each situated on the optical axis A, but the surface apex P5 of the third surface 55c of the fifth optical element 55 is decentered as to the optical axis A. Accordingly, the distance between the aperture diaphragm 3 and the third surface 55c is defined as Lm=La+Lb where the distance between the aperture diaphragm 3 and the second surface 55b on the optical axis A is La and the distance between the second surface 55b and the third surface 55c on the normal Ar passing through the surface apex P5 of the third surface 55c is Lb. La=8.500 mm and Lb=9.800 mm here, so Lm=18.300 mm.

The curvature radius of the base spherical surface of the third surface 55c is Rm=43.422 mm, and |Rm|/Lm=2.37 holds, so Conditional Expression (2) is satisfied. Also in the present Example, the focal length of the optical part from the refractive surface 51a closest to the object side to the refractive surface 55b immediately short of the reflective surface 55c having the greatest power in the rear group 2 is ff=62.4 mm, so |Rm|/ff=0.70 holds, and thus Conditional Expression (3) is satisfied. Further, the focal length of the entire system is 15.7 mm, and f/|Rm|=0.36 holds, so Conditional Expression (4) is satisfied.

Table 10 shows the values of Conditional Expressions (1) through (5), (7), and (8), in the optical system 50 according to the present Example.

TABLE 10

Table 10: Conditional Expressions (Fifth Example)

| Conditional Expressions (1), (1') \|Rl\|/Ll | 1.173 (Surface No. 1) | 1.244 (Surface No. 5) |
|---|---|---|
| Conditional Expressions (2), (2') \|Rm\|/Lm | 2.373 (Surface No. 7) | |
| Conditional Expressions (3) \|Rm\|/ff | 0.70 (Surface No. 7) | |
| Conditional Expressions (4) f/\|Rm\| | 0.36 (Surface No. 7) | |
| Conditional Expressions (5) Lp/f | 0.12 | |
| Conditional Expressions (7) ϕl/ϕ | −0.323 (Surface No. 5) | |
| Conditional Expressions (8) (D1 + D2)/f | 0.09 (Surface No. 1.5) | |

As described above, the second surface 55*b* of the fifth optical element 55 is disposed inclined as to the optical axis A in the optical system 50 according to the present Example, and optical surfaces closer to the image side therefrom are decentered in vertical cross-section, thereby also decentering the image plane 4 in vertical cross-section as well. Accordingly, in the present Example, an elliptically-shaped aperture is provided to the aperture diaphragm 3, with the major axis of the aperture being parallel in horizontal cross-section and the minor axis of the aperture being parallel in vertical cross-section. That is to say, the aperture diaphragm 3 is disposed so that the major axis of the aperture matches the horizontal direction, and the minor axis of the aperture matches the vertical direction.

Accordingly, an arrangement can be made where the optical path of the light ray reflected at the second surface 55*b* of the fifth optical element 55 does not interfere with the first surface 55*a* of the fifth optical element 55, while shortening the optical path from the aperture diaphragm 3 to the reflective surface 55*c* that has the strongest power in the rear group 2. If the optical path from the aperture diaphragm 3 to the reflective surface 55*c* is long, the optical path from the reflective surface 55*c* to the image plane 4 becomes short, and positioning of the image plane 4 becomes difficult. Specifically, the aperture diaphragm 3 according to the present Example is provided with an elliptically-shaped aperture of which the length of the major axis in the horizontal direction is 7.6 mm and the length of the minor axis in the vertical direction is 3.0 mm.

Figure 19B:
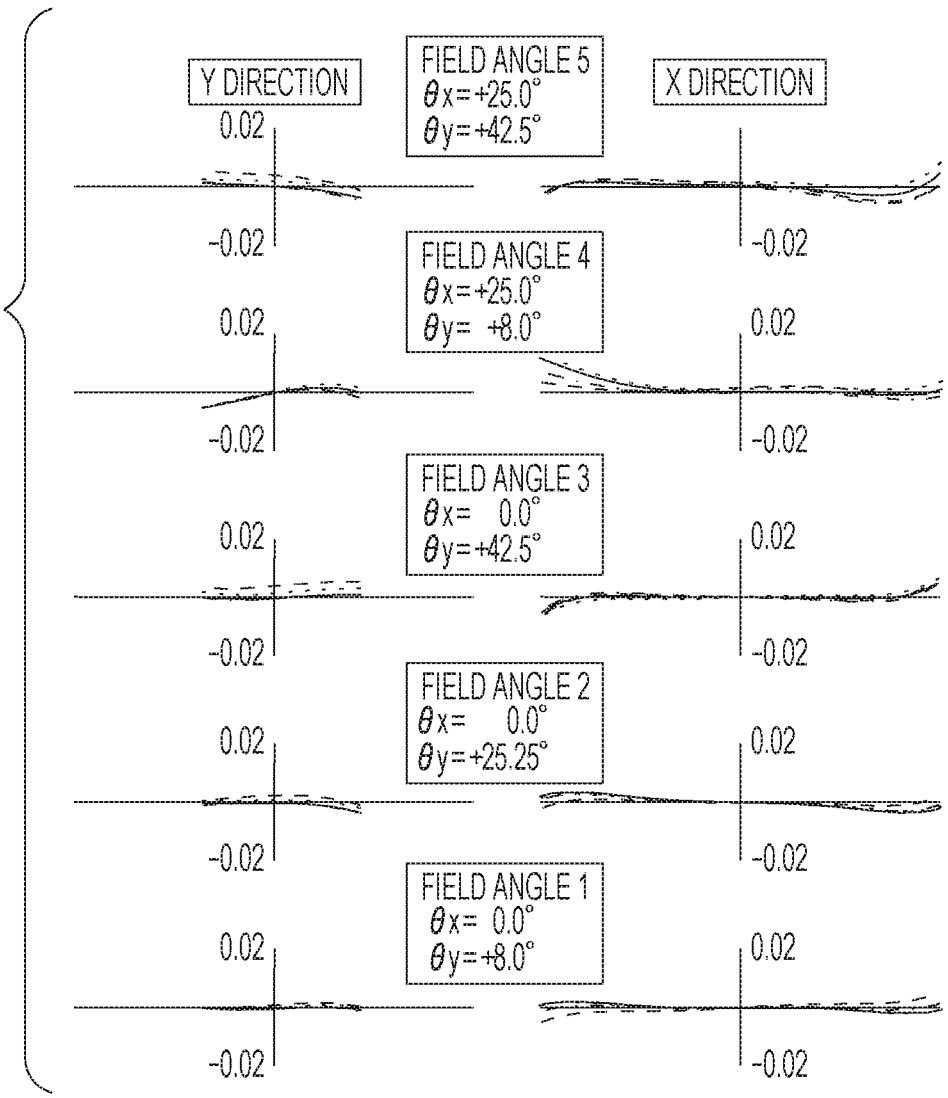

FIGS. 19A and 19B are aberration diagrams regarding the optical system 50, where FIGS. 19A and 19B are a longitudinal aberration diagram and a lateral aberration diagram, respectively. It can be seen from FIG. 19A that the spherical aberration, astigmatism, and field curvature were favorably corrected regarding each spectrum of the C ray, d ray, F ray, and g ray. It can also be seen from FIG. 19B that lateral aberration was favorably corrected at each field angle.

Although preferable embodiments and examples of the present invention has been described above, the present invention is not restricted to these embodiments and examples, and various combinations, modifications, and alterations may be made within the scope of the essence thereof.

As described above, the optical systems in the examples can be applied to a projecting apparatus without change. In this case, the object side (reduction side) and image side (enlargement side) in the imaging apparatus are reversed and the optical path becomes opposite, the front group 1 becomes the rear group and the rear group 2 becomes the front group, the surfaces of incidence of the optical elements become the emitting surfaces, and the emitting surfaces become the surfaces of incidence. That is to say, a configuration can be made where an image displayed on a display surface (reduction surface) of the display device disposed at the object side is projected (imaged) in a projection surface (enlargement surface) such as a screen or the like, disposed at the image side by the optical system.

The Conditional Expressions in the examples are preferably satisfied in a projecting optical system as well, in the same way as in the imaging optical systems. In this case, in Conditional Expression (5), the entrance pupil (enlargement side pupil) at the aperture diaphragm in the imaging optical system corresponds to an emission pupil (reduction side pupil) of the aperture diaphragm in a projecting optical system.

Onboard Camera System

Figure 20:
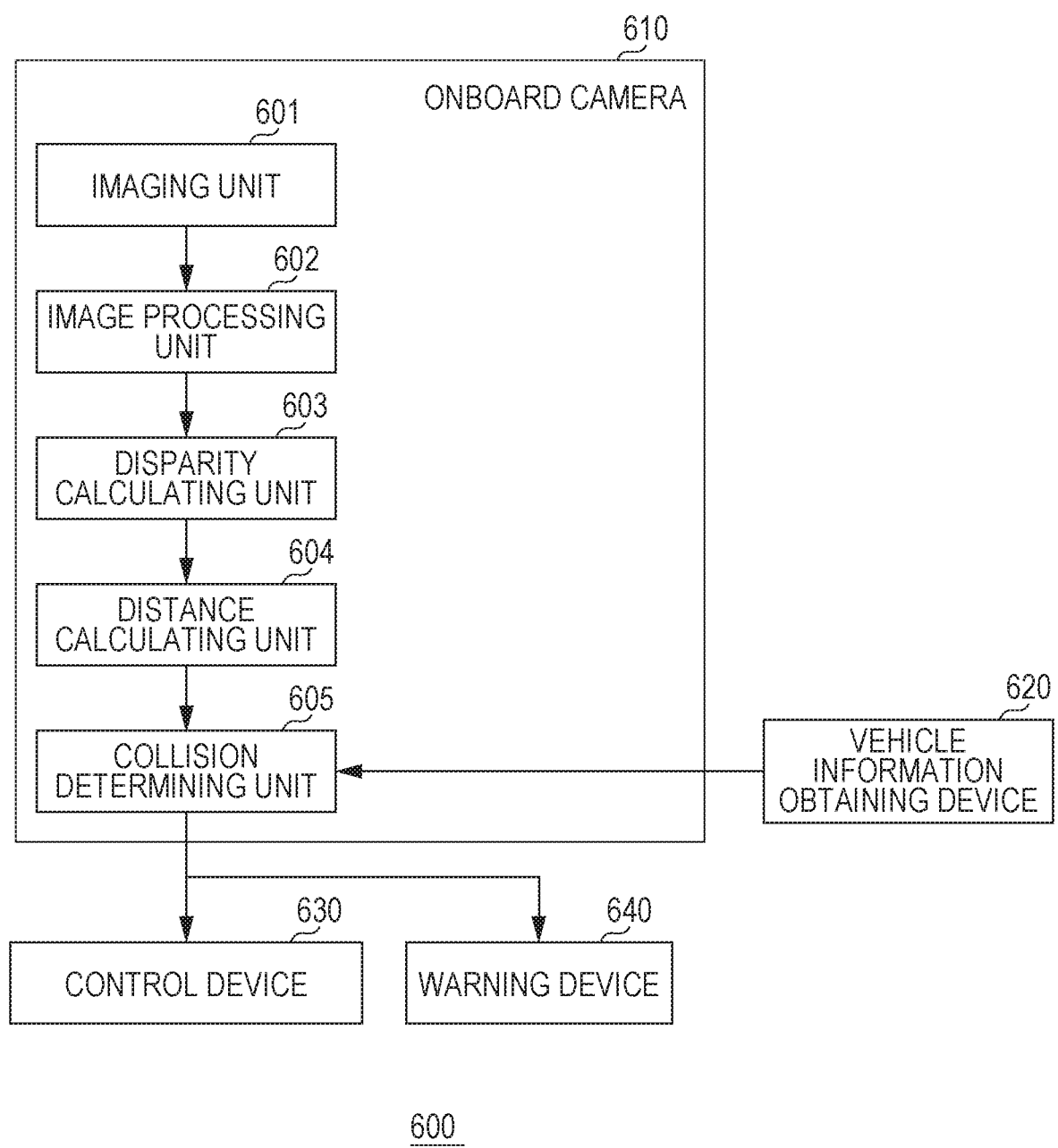
FIG. 20 is a functional block diagram of an onboard camera system according to an embodiment of the present invention.
Figure 21:
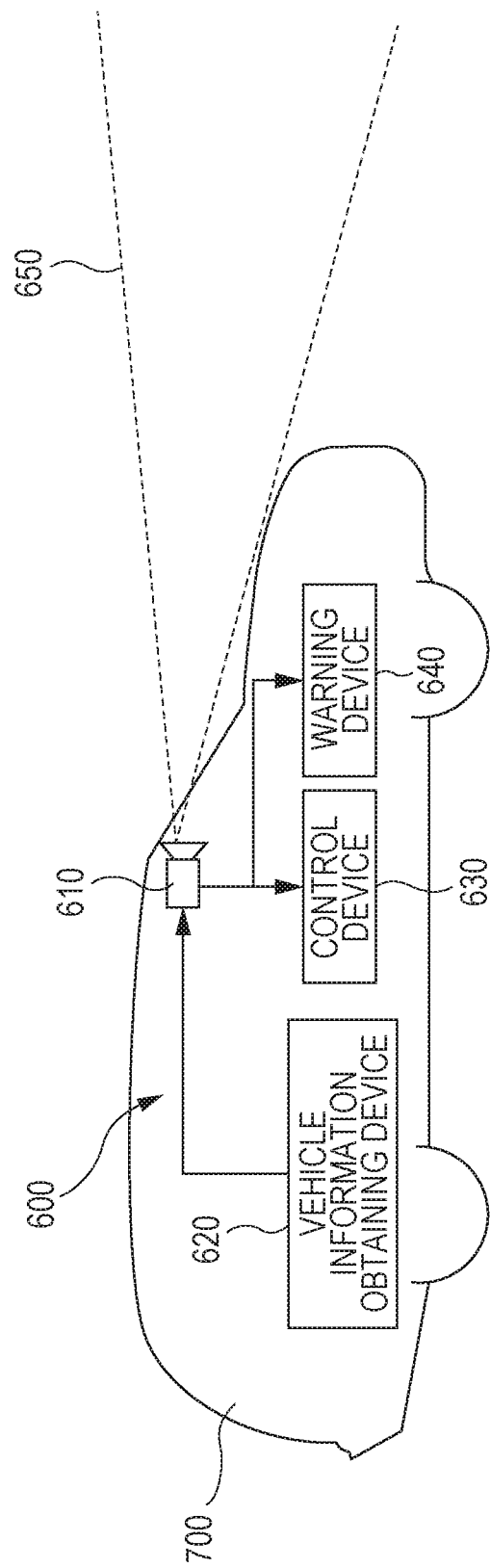
FIG. 21 is a schematic diagram of principal portions of a vehicle according to the embodiment of the present invention.

FIG. 20 is a configuration diagram of an onboard camera 610 according to the present embodiment, and an onboard camera system (driving assistance apparatus) 600 having the same. The onboard camera system 600 is an apparatus that is installed in a vehicle such as an automobile or the like, and assists driving of the vehicle based on image information of the surroundings of the vehicle, obtained by the onboard camera 610. FIG. 21 is a schematic diagram of a vehicle 700 that has the onboard camera system 600. Although FIG. 21 illustrates a case where an imaging range 650 of the onboard camera 610 is set ahead of the vehicle 700, but the imaging range 650 may be set behind the vehicle 700.

The onboard camera system 600 includes the onboard camera 610, a vehicle information obtaining device 620, a control device (ECU: electronic control unit) 630, and a warning device 640, as illustrated in FIG. 20. The onboard camera 610 includes an imaging unit 601, an image processing unit 602, a disparity calculating unit 603, a distance calculating unit 604, and a collision determining unit 605. The imaging unit 601 has an optical system according to any one of the above-described examples, and an image plane phase difference sensor. Note that the image plane phase difference sensor and image processing unit 602 according to the present embodiment correspond to the imaging device 101 and processing unit 103 that the imaging apparatus 100 has in the second Example illustrated in FIG. 9, for example.

Figure 22:
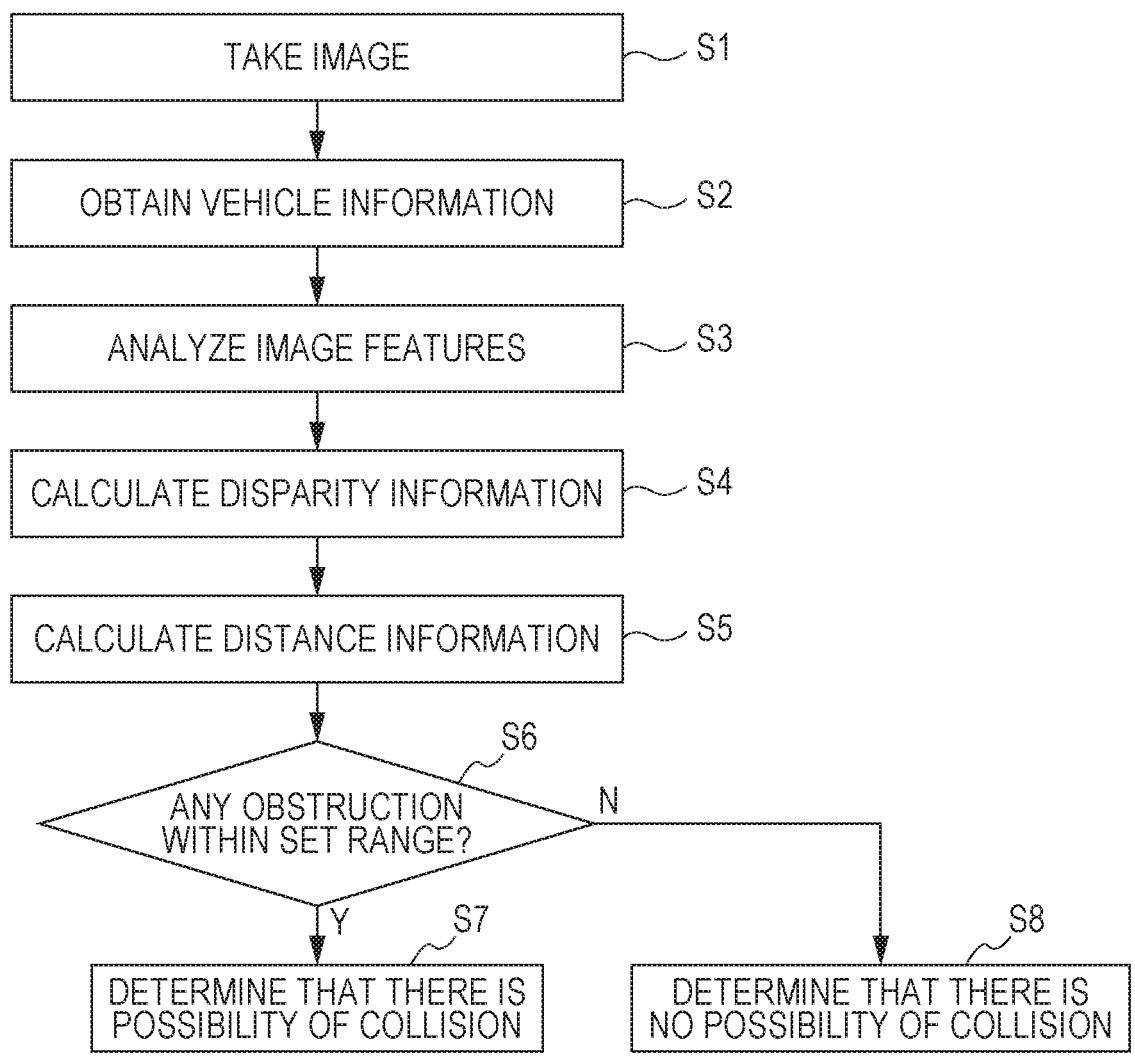
FIG. 22 is a flowchart illustrating an operation example of the onboard camera system according to the embodiment.

FIG. 22 is a flowchart illustrating an example of operations of the onboard camera system 600 according to the present embodiment. The operations of the onboard camera system 600 will be described below following this flowchart.

First, the imaging unit 601 is used to image objects (subjects) around the vehicle, and multiple image data (disparity image data) is obtained in step S1.

In step S2, vehicle information is obtained from the vehicle information obtaining device 620. Vehicle information is information including vehicle speed, yaw rate, steering angle, and so forth.

In step S3, the image processing unit 602 performs image processing on the multiple image data obtained by the imaging unit 601. Specifically, image feature analysis, where features such as edge quantity, direction, concertation values and so forth, in the image data, are analyzed. Image feature analysis here may be performed on each of the multiple image data, or may be performed only on part of the image data out of the multiple image data.

In step S4, the disparity calculating unit 603 calculates disparity (image offset) information between the multiple image data obtained by the imaging unit 601. Known methods such as the SSDA method, image correlation, and so forth, can be used as the calculation method for disparity information, so description will be omitted in the present embodiment. Note that steps S2, S3, and S4 may be processed in the above-described order, or may be performed in parallel.

In step S5, the distance calculating unit 604 calculates distance information to an object imaged by the imaging unit 601. Distance information can be calculated based on disparity information calculated by the disparity calculating unit 603, and infernal parameters of the imaging unit 601 and external parameters. Distance information as used here is information relating to relative position as to the object, such as distance to the object, defocusing amount, image offset amount, and so forth, and may be that directly representing a distance value to an object in an image, or may be that indirectly representing information corresponding to a distance value.

The collision determining unit 605 then performs determination in step S6 regarding whether or not the distance information calculated by the distance calculating unit 604 is included in a range of set distance that has been set beforehand. Accordingly, whether or not there is an obstruction around the vehicle within the set distance can be determined, and the possibility of a collision of the vehicle with the obstruction can be determined. In a case where there is an obstruction within the set distance, the collision determining unit 605 determines that there is a possibility of collision (step S7), and in a case where there is no obstruction within the set distance, determines that there is not possibility of collision (step S8).

Next, in a case of having determined that there is a possibility of collision (step S7), the collision determining unit 605 notifies the determination results to the control device 630 and warning device 640. The control device 630 controls the vehicle based on the determination results of the collision determining unit 605, and the warning device 640 issues a warning based on the determination results of the collision determining unit 605.

For example, the control device 630 performs control of the vehicle such as applying brakes, letting up on the accelerator, generating control signals to generate braking force at the wheels and suppressing output of the engine or motor, and so forth. The warning device 640 warns the user (driver) of the vehicle by making a warning sound or the like, displaying warning information of a screen of a car navigation system or the like, applying vibrations to the seatbelt or steering wheel, or the like.

Thus, according to the onboard camera system 600 of the present embodiment, the above-described processing enables obstructions to be effectively detected, and collision of the vehicle with an obstruction to be avoided. Particularly, applying the optical system according to the above-described Examples to the onboard camera system 600 obstruction detection and enables collision determination to be performed with high precision over a side field angle, while reducing the size of the overall onboard camera 610 and increasing freedom of layout.

Now, description has been made in the present embodiment regarding a configuration where the onboard camera 610 only has one imaging unit 601 having an image plane phase difference sensor, but this is not restrictive, and a stereo camera having two imaging units may be employed as the onboard camera 610. In this case, processing the same as that described above can be performed by simultaneously obtaining image data by each of two synchronized imaging units, and using the two image data, even without using an image plane phase difference sensor. Note however, that if the difference in imaging time by the two imaging units is known, the two imaging units do not have to be synchronized.

Note that various embodiments can be conceived regarding calculation of distance information. As one example, a case of employing a split-pupil imaging device having multiple pixel units arrayed regularly in a two-dimensional array as the imaging device that the imaging unit 601 has will be described. In a split-pupil imaging device, one pixel unit is made up of a microlens and multiple photo-electric conversion units. A pair of light fluxes passing through different regions in the pupil of the optical system can be received, and a pair of image data can be output from the respective photo-electric conversion units.

The amount of image offset in each region is calculated by computation of correlation between pairs of image data, and image offset map data representing the distribution of amount of image offset is calculated by the distance calculating unit 604. Alternatively, the distance calculating unit 604 may convert the amount of image offset into defocusing amount, and generate defocusing map data representing the distribution of defocusing amount (distribution on two-dimensional plane of the imaged image). Further, the distance calculating unit 604 may obtain distance map data regarding the distance to the object, that has been converted from the defocusing amount.

The vertical field angle of the optical systems according to the Examples is set only for one side with regard to the optical axis A, as described above. Accordingly, in a case of applying the optical system according to the Examples to the onboard camera 610 and installing this onboard camera 610 in a vehicle, installation is preferably performed such that the optical axis A of the optical system is not parallel to the horizontal direction. For example, in a case of employing the optical system 10 according to the First Example illustrated in FIG. 1, the optical axis A can be inclined upwards as to the horizontal direction (Z direction), so that the center of the vertical field angle is closer to the horizontal direction. Alternatively, the optical system 10 may be rotated 180° on the X axis (vertically inverted), and disposed so that the optical axis A is include toward the lower side as to the horizontal direction. Accordingly, the imaging range of the onboard camera 610 can be appropriately set.

However, optical performance is the highest on-axis in an optical system, and optical performance is lower at fringe fields, as described above, so it is even more preferably to position such that light from an imaging object of interest passes through around the axis of the optical system. For example, in a case where there is need to focus on traffic signs and obstacles and the like on the road with the onboard camera 610, it is preferable to raise the optical performance at a field angle at the lower side (ground side) of the horizontal direction rather than the upper side (sky side). In a case of employing the optical system 10 according to the First Example, the optical system 10 can be temporarily vertically inverted and then the optical axis A inclined downwards as to the horizontal direction, so that the field angle near the optical axis A is directed downwards.

Although the onboard camera system 600 has been applied to driving support (collision damage reduction) in the present embodiment, this is not restrictive, and the onboard camera system 600 may be applied to cruise control (including those with all-speed-range tracking functions) and automatic driving and so forth. Application of the onboard camera system 600 is also not restricted to vehicles such as automobiles and the like, and may be applied to moving bodies (moving devices) such as ships, aircraft, industrial robots, and so forth, for example. This also is not restricted to the onboard camera 610 according to the present embodiment and moving bodies, and can be broadly applied to devices using object recognition, such as intelligent transport systems (ITS) and so forth.

The present invention is not restricted to the above embodiment, and various alterations and modifications may be made without departing from the spirit and scope of the present invention. Accordingly, the following Claims are attached to lay forth the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An optical system comprising, in order from an enlargement side:
   a front group having first and second refractive surfaces convex toward the enlargement side;
   an aperture diaphragm; and
   a rear group having a concave reflective surface included in a surface rotation-symmetrical to an optical axis, and
   wherein the following Conditional Expressions are satisfied:

$0.7 \leq |Rl1|/Ll1 \leq 1.5$ $0.7 \leq |Rl2|/Ll2 \leq 1.5$ $2 \leq |Rm|/Lm \leq 7$ where a curvature radius of the first refractive surface is Rl1, a distance between the first refractive surface and the aperture diaphragm is Ll1, a curvature radius of the second refractive surface is Rl2, a distance between the second refractive surface and the aperture diaphragm is Ll2, a curvature radius of the reflective surface is Rm, and a distance between the aperture diaphragm and the reflective surface is Lm.

2. The optical system according to claim 1, wherein the following Conditional Expression is satisfied, $0.5 \leq |Rm|/f\!f \leq 2$ where ff is a focal length of an optical part from an optical surface closest to the enlargement side in the front group to an optical surface immediately short of the reflective surface.

3. The optical system according to claim 1, wherein the following Conditional Expression is satisfied, $0.25 \leq f/|Rm| \leq 0.45$ where f is a focal length of the optical system.

4. The optical system according to claim 1, wherein the following Conditional Expression is satisfied, $0.0 \leq Lp/f \leq 0.2$ where Lp is a distance between the aperture diaphragm and an enlargement side pupil, and f is a focal length of the optical system.

5. The optical system according to claim 1, wherein the following Conditional Expression is satisfied, $0.0 \leq Dc/f \leq 0.1$ where a distance between the center of curvature of the refractive surface that is closest to the enlargement side out of the first and second refractive surfaces, and the center of curvature of another refractive surface is D, and the focal length of the optical system is f.

6. The optical system according to claim 1, wherein one of the first and second refractive surfaces is a refractive surface having negative power, and the following Conditional Expression is satisfied, $\phi l/\phi \leq -0.27$ where the negative power is $\phi l$ and the power of the optical system is $\phi$.

7. The optical system according to claim 1, wherein the power of the rear group is greater than the power of the front group.

8. The optical system according to claim 1, wherein an optical surface closest to the aperture diaphragm has negative power.

9. An imaging apparatus comprising:
   an imaging device configured to image an object; and
   the optical system according to claim 1.

10. The imaging apparatus according to claim 9, wherein a center of the imaging surface is decentered as to an optical axis of the optical system.

11. The imaging apparatus according to claim 9, wherein the imaging surface is a planar surface.

12. The imaging apparatus according to claim 9, wherein a field angle in a second cross-section perpendicular that includes the optical axis and is perpendicular to a first cross-section, is smaller than a field angle in the first cross-section including the optical axis.

13. The imaging apparatus according to claim 12, wherein, in the second cross-section, the imaging surface only receives light fluxes entering the optical system from a side opposite to the imaging device with regard to the optical axis.

14. The imaging apparatus according to claim 12, wherein an elliptically-shaped aperture is provided to the aperture diaphragm, where a major axis of the aperture is parallel to the first cross-section, and a minor axis of the aperture is parallel to the second cross-section.

15. An onboard camera system comprising:
   the imaging apparatus according to claim 10; and
   a distance calculating unit configured to obtaining distance information to the object, based on the image data.

16. The onboard camera system according to claim 15, further comprising a collision determining unit configured to determining a possibility of collision of a vehicle with the object, based on the distance information.

17. The onboard camera system according to claim 16, further comprising a control device configured to output control signals to generate braking force at wheels of the vehicle in a case where determination has been made that there is a possibility of collision of the vehicle with the object.

18. The onboard camera system according to claim 16, further comprising a warning device configured to issue a warning to a driver of the vehicle in a case where determination has been made that there is a possibility of collision of the vehicle with the object.

19. An optical system comprising, in order from an enlargement side:
   a front group having a first refractive surface convex toward the enlargement side;
   an aperture diaphragm; and
   a rear group having a concave reflective surface included in a surface rotation-symmetrical to an optical axis, and having a second refractive surface concave toward the enlargement side wherein the following Conditional Expressions are satisfied:

$0.7 \leq |Rl1|/Ll1 \leq 1.5$ $0.7 \leq |Rl2|/Ll2 \leq 1.5$ $2 \leq |Rm|/Lm \leq 7$ $-0.2 \leq (D1+D2)/f \leq 0.2$ where a curvature radius of the first refractive surface is Rl1, a distance between the first refractive surface and the aperture diaphragm is Ll1, a curvature radius of the second refractive surface is Rl2, a distance between the second refractive surface and the aperture diaphragm is Ll2, a curvature radius of the reflective surface is Rm, a distance between the aperture diaphragm and the reflective surface is Lm, a distance between a center of curvature of the first refractive surface and the aperture diaphragm is D1, a distance between a center of curvature of the third refractive surface and the aperture diaphragm is D2, and the focal length of the optical system is f.

* * * * *